US008321805B2

(12) United States Patent
Tien et al.

(10) Patent No.: US 8,321,805 B2
(45) Date of Patent: Nov. 27, 2012

(54) SERVICE ARCHITECTURE BASED METRIC VIEWS

(75) Inventors: Ian Tien, Seattle, WA (US); Corey Hulen, Sammamish, WA (US); Chen-I Lim, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 146 days.

(21) Appl. No.: 11/668,520

(22) Filed: Jan. 30, 2007

(65) Prior Publication Data

US 2008/0184130 A1   Jul. 31, 2008

(51) Int. Cl.
*G06F 3/048* (2006.01)

(52) U.S. Cl. .......................... 715/772; 715/736

(58) Field of Classification Search .................. 715/772, 715/774, 742, 736
See application file for complete search history.

(56) References Cited

U.S. PATENT DOCUMENTS

| 5,018,077 | A | 5/1991 | Healey | 715/509 |
|---|---|---|---|---|
| 5,233,552 | A | 8/1993 | Brittan | 708/445 |
| 5,253,362 | A | 10/1993 | Nolan et al. | 707/1 |
| 5,404,295 | A | 4/1995 | Katz et al. | 715/231 |
| 5,473,747 | A | 12/1995 | Bird et al. | 715/848 |
| 5,615,347 | A | 3/1997 | Davis et al. | 715/833 |
| 5,675,553 | A | 10/1997 | O'Brien, Jr. et al. | 367/135 |
| 5,675,782 | A | 10/1997 | Montague et al. | 726/4 |
| 5,680,636 | A | 10/1997 | Levine et al. | 715/512 |
| 5,758,351 | A | 5/1998 | Gibson et al. | 707/104 |
| 5,764,890 | A | 6/1998 | Glasser et al. | 726/11 |
| 5,779,566 | A | 7/1998 | Wilens | 473/407 |
| 5,797,136 | A | 8/1998 | Boyer et al. | 707/2 |
| 5,819,225 | A | 10/1998 | Eastwood et al. | 704/275 |
| 5,832,504 | A | 11/1998 | Tripathi et al. | 715/235 |
| 5,838,313 | A | 11/1998 | Hou et al. | 715/201 |
| 5,845,270 | A | 12/1998 | Schatz et al. | 706/11 |
| 5,877,758 | A | 3/1999 | Seybold | 715/866 |
| 5,911,143 | A | 6/1999 | Deinhart et al. | 1/1 |
| 5,926,794 | A | 7/1999 | Fethe | 705/11 |
| 5,941,947 | A | 8/1999 | Brown et al. | 709/225 |
| 5,943,666 | A | 8/1999 | Kleewein et al. | 1/1 |

(Continued)

FOREIGN PATENT DOCUMENTS

EP    1128299 A1    8/2001

(Continued)

OTHER PUBLICATIONS

"Business Analysis with OLAP", Netways, http://www.netways.com/newsletter.olap.html, printed Mar. 7, 2006, 3 pp.

(Continued)

*Primary Examiner* — Omar Abdul-Ali

(74) *Attorney, Agent, or Firm* — Merchant & Gould

(57) ABSTRACT

Scorecard associated content is provided to limited user interfaces of desktop visualization applications on a user's computing device (e.g. a mobile computing device, an ultra-mobile computing device, a personal digital assistant, an in-car computing system, and a tablet computing device) for delivery of personalized and scalable metrics. Users are enabled to set up personalized metric views based on predefined or user-defined desktop visualization applications employing indicators, partial report views, audio, video, and the like. Data delivery attributes from local or remote data sources can be set for deployment of the desktop visualization applications in a service based architecture. Computing device visualization applications may also be used to activate local or remote applications for various scorecard operations.

20 Claims, 11 Drawing Sheets

EXAMPLE DESKTOP VISUALIZATION APPLICATION FOR PERFORMANCE METRICS SCREENSHOT

U.S. PATENT DOCUMENTS

| | | | |
|---|---|---|---|
| 5,956,691 A | 9/1999 | Powers | 705/4 |
| 6,012,044 A | 1/2000 | Maggioncalda et al. | 705/36 R |
| 6,023,714 A | 2/2000 | Hill et al. | 715/235 |
| 6,061,692 A | 5/2000 | Thomas et al. | 707/613 |
| 6,115,705 A | 9/2000 | Larson | 1/1 |
| 6,119,137 A | 9/2000 | Smith et al. | 715/234 |
| 6,141,655 A | 10/2000 | Johnson et al. | 707/2 |
| 6,163,779 A | 12/2000 | Mantha et al. | 707/100 |
| 6,182,022 B1 | 1/2001 | Mayle et al. | 702/182 |
| 6,216,066 B1 | 4/2001 | Goebel et al. | 701/29 |
| 6,226,635 B1 | 5/2001 | Katariya | 1/1 |
| 6,230,310 B1 | 5/2001 | Arrouye et al. | 717/136 |
| 6,233,573 B1 | 5/2001 | Bair et al. | 707/3 |
| 6,249,784 B1 | 6/2001 | Macke | 707/3 |
| 6,308,206 B1 | 10/2001 | Singh | 709/223 |
| 6,321,206 B1 | 11/2001 | Honarvar | 705/7 |
| 6,341,277 B1 | 1/2002 | Coden et al. | 1/1 |
| 6,345,279 B1 | 2/2002 | Li et al. | 715/202 |
| 6,389,434 B1 | 5/2002 | Rivette | 715/512 |
| 6,393,406 B1 | 5/2002 | Eder | 705/7 |
| 6,421,670 B1 | 7/2002 | Fourman | 707/10 |
| 6,463,431 B1 | 10/2002 | Schmitt | 1/1 |
| 6,466,935 B1 | 10/2002 | Stuart | 1/1 |
| 6,493,733 B1 | 12/2002 | Pollack | 715/513 |
| 6,516,324 B1 | 2/2003 | Jones | 707/104.1 |
| 6,519,603 B1 | 2/2003 | Bays | 707/102 |
| 6,522,342 B1 | 2/2003 | Gagnon et al. | 715/716 |
| 6,529,215 B2 | 3/2003 | Golovchinsky et al. | 715/764 |
| 6,563,514 B1 * | 5/2003 | Samar | 715/711 |
| 6,578,004 B1 | 6/2003 | Cimral | 705/7 |
| 6,601,233 B1 | 7/2003 | Underwood | 717/102 |
| 6,604,084 B1 | 8/2003 | Powers et al. | 705/11 |
| 6,606,627 B1 | 8/2003 | Guthrie et al. | 1/1 |
| 6,628,312 B1 | 9/2003 | Rao | 715/853 |
| 6,633,889 B2 | 10/2003 | Dessloch et al. | 1/1 |
| 6,658,432 B1 | 12/2003 | Alavi et al. | 707/104.1 |
| 6,665,577 B2 | 12/2003 | Onyshkevych et al. | 700/130 |
| 6,677,963 B1 | 1/2004 | Mani et al. | 715/764 |
| 6,687,735 B1 | 2/2004 | Logston et al. | 709/203 |
| 6,687,878 B1 | 2/2004 | Eintracht | 712/512 |
| 6,728,724 B1 | 4/2004 | Megiddo et al. | 1/1 |
| 6,763,134 B2 | 7/2004 | Cooper et al. | 382/162 |
| 6,772,137 B1 | 8/2004 | Hurwood et al. | 707/2 |
| 6,775,675 B1 | 8/2004 | Nwabueze | 707/100 |
| 6,782,421 B1 | 8/2004 | Soles et al. | 709/223 |
| 6,785,675 B1 | 8/2004 | Graves et al. | 1/1 |
| 6,804,657 B1 | 10/2004 | Sultan | 705/7.31 |
| 6,831,575 B2 | 12/2004 | Wu et al. | 341/50 |
| 6,831,668 B2 | 12/2004 | Cras | 715/853 |
| 6,842,176 B2 | 1/2005 | Sang'Udi | 345/440 |
| 6,850,891 B1 | 2/2005 | Forman | 705/7 |
| 6,854,091 B1 | 2/2005 | Beaudoin | 715/854 |
| 6,859,798 B1 | 2/2005 | Bedell et al. | 706/45 |
| 6,867,764 B2 | 3/2005 | Ludtke | 345/173 |
| 6,868,087 B1 | 3/2005 | Agarwala et al. | 370/412 |
| 6,874,126 B1 * | 3/2005 | Lapidous | 715/711 |
| 6,898,603 B1 | 5/2005 | Petculescu et al. | 707/101 |
| 6,900,808 B2 | 5/2005 | Lassiter et al. | 345/440 |
| 6,901,426 B1 | 5/2005 | Powers et al. | 709/203 |
| 6,917,921 B1 | 7/2005 | Cimral et al. | 705/7 |
| 6,959,306 B2 | 10/2005 | Nwabueze | 707/104.1 |
| 6,963,826 B2 | 11/2005 | Hanaman et al. | 703/2 |
| 6,968,312 B1 | 11/2005 | Jordan | 705/7 |
| 6,973,616 B1 | 12/2005 | Cottrille et al. | 715/512 |
| 6,976,086 B2 | 12/2005 | Sadeghi et al. | 709/236 |
| 6,988,076 B2 | 1/2006 | Ouimet | 705/7 |
| 6,995,768 B2 | 2/2006 | Jou | 345/440 |
| 7,013,285 B1 | 3/2006 | Rebane | 705/10 |
| 7,015,911 B2 | 3/2006 | Shaughnessy et al. | 345/440 |
| 7,027,051 B2 * | 4/2006 | Alford et al. | 345/440 |
| 7,043,524 B2 | 5/2006 | Shah et al. | 709/203 |
| 7,058,638 B2 | 6/2006 | Singh | 707/100 |
| 7,065,784 B2 | 6/2006 | Hopmann et al. | 726/4 |
| 7,079,010 B2 | 7/2006 | Champlin | 340/286.02 |
| 7,158,628 B2 * | 1/2007 | McConnell et al. | 379/265.02 |
| 7,181,417 B1 * | 2/2007 | Langseth et al. | 705/26 |
| 7,200,595 B2 | 4/2007 | Dutta et al. | 1/1 |
| 7,216,116 B1 | 5/2007 | Nilsson et al. | 1/1 |
| 7,222,308 B2 | 5/2007 | Sauermann et al. | 715/833 |
| 7,224,847 B2 | 5/2007 | Zhang et al. | |
| 7,249,120 B2 | 7/2007 | Bruno et al. | 1/1 |
| 7,275,024 B2 | 9/2007 | Yeh et al. | 703/2 |
| 7,302,421 B2 | 11/2007 | Aldridge | 1/1 |
| 7,302,431 B1 | 11/2007 | Apollonsky et al. | 1/1 |
| 7,302,444 B1 | 11/2007 | Dunmore et al. | 1/1 |
| 7,313,561 B2 | 12/2007 | Lo et al. | 1/1 |
| 7,340,448 B2 | 3/2008 | Santosuosso | 1/1 |
| 7,349,862 B2 | 3/2008 | Palmer et al. | 705/7 |
| 7,349,877 B2 | 3/2008 | Ballow et al. | 705/36 R |
| 7,359,865 B1 | 4/2008 | Connor et al. | 705/10 |
| 7,383,247 B2 | 6/2008 | Li et al. | 1/1 |
| 7,398,240 B2 | 7/2008 | Ballow et al. | 705/35 |
| 7,406,431 B2 | 7/2008 | Spira et al. | 705/7 |
| 7,409,357 B2 | 8/2008 | Schaf et al. | 705/7 |
| 7,412,398 B1 | 8/2008 | Bailey | 705/10 |
| 7,433,876 B2 | 10/2008 | Spivack et al. | 1/1 |
| 7,440,976 B2 | 10/2008 | Hart et al. | 707/203 |
| 7,454,393 B2 | 11/2008 | Horvitz et al. | 706/46 |
| 7,496,852 B2 * | 2/2009 | Eichorn et al. | 715/764 |
| 7,496,857 B2 | 2/2009 | Stata et al. | 715/833 |
| 7,509,343 B1 | 3/2009 | Washburn et al. | 707/104.1 |
| 7,546,226 B1 | 6/2009 | Yeh et al. | 703/2 |
| 7,546,246 B1 | 6/2009 | Stamm et al. | 705/7 |
| 7,548,912 B2 | 6/2009 | Gideoni et al. | 1/1 |
| 7,559,023 B2 | 7/2009 | Hays et al. | 715/255 |
| 7,568,217 B1 | 7/2009 | Prasad et al. | 726/3 |
| 7,587,665 B2 | 9/2009 | Crow et al. | 715/212 |
| 7,587,755 B2 | 9/2009 | Kramer | 726/4 |
| 7,599,848 B2 | 10/2009 | Wefers et al. | 705/7 |
| 7,613,625 B2 | 11/2009 | Heinrich | 705/7 |
| 7,617,177 B2 | 11/2009 | Bukary et al. | 1/1 |
| 7,617,187 B2 | 11/2009 | Zhu et al. | 715/243 |
| 7,630,965 B1 | 12/2009 | Erickson et al. | 1/1 |
| 7,634,478 B2 | 12/2009 | Yang et al. | 1/1 |
| 7,636,709 B1 | 12/2009 | Srikant et al. | |
| 7,640,506 B2 * | 12/2009 | Pratley et al. | 715/751 |
| 7,660,731 B2 | 2/2010 | Chaddha et al. | 705/8 |
| 7,667,582 B1 | 2/2010 | Waldorf | 340/440 |
| 7,685,207 B1 | 3/2010 | Helms | 707/790 |
| 7,694,270 B2 | 4/2010 | Manikotia et al. | 717/101 |
| 7,698,349 B2 | 4/2010 | Hulen et al. | 707/805 |
| 7,702,554 B2 | 4/2010 | Ballow et al. | 705/35 |
| 7,702,779 B1 | 4/2010 | Gupta et al. | 709/224 |
| 7,707,490 B2 | 4/2010 | Hays et al. | 715/234 |
| 7,716,253 B2 | 5/2010 | Netz et al. | 707/803 |
| 7,716,278 B2 | 5/2010 | Beringer et al. | 709/203 |
| 7,716,571 B2 | 5/2010 | Tien et al. | 715/212 |
| 7,716,592 B2 | 5/2010 | Tien et al. | 715/744 |
| 7,725,947 B2 | 5/2010 | Bukary et al. | 726/30 |
| 7,730,023 B2 | 6/2010 | MacGregor | 707/603 |
| 7,730,123 B1 | 6/2010 | Erickson et al. | 709/203 |
| 7,739,148 B2 | 6/2010 | Suzuki et al. | 705/26 |
| 7,747,572 B2 | 6/2010 | Scott et al. | 707/636 |
| 7,752,094 B2 | 7/2010 | Davidson et al. | 705/31 |
| 7,752,301 B1 | 7/2010 | Maiocco et al. | 709/224 |
| 7,778,910 B2 | 8/2010 | Ballow et al. | 705/36 R |
| 7,788,280 B2 | 8/2010 | Singh et al. | 707/791 |
| 7,792,774 B2 | 9/2010 | Friedlander et al. | 706/47 |
| 7,822,662 B2 * | 10/2010 | Guzik et al. | 705/35 |
| 7,831,464 B1 | 11/2010 | Nichols et al. | 705/7.39 |
| 7,840,896 B2 | 11/2010 | Tien et al. | 715/243 |
| 7,848,947 B1 | 12/2010 | McGloin et al. | |
| 7,899,833 B2 | 3/2011 | Stevens et al. | |
| 7,899,843 B2 | 3/2011 | Dettinger et al. | |
| 7,904,797 B2 | 3/2011 | Wong et al. | |
| 8,126,750 B2 | 2/2012 | Tien et al. | |
| 8,190,992 B2 | 5/2012 | Tien et al. | |
| 2001/0004256 A1 | 6/2001 | Iwata et al. | 345/204 |
| 2001/0051835 A1 | 12/2001 | Cline | 700/91 |
| 2001/0054046 A1 | 12/2001 | Mikhailov et al. | 707/500 |
| 2002/0029273 A1 | 3/2002 | Haroldson et al. | 709/226 |
| 2002/0038217 A1 | 3/2002 | Young | 705/1 |
| 2002/0049621 A1 | 4/2002 | Bruce | 705/7 |
| 2002/0052740 A1 | 5/2002 | Charlesworth | 704/220 |
| 2002/0052862 A1 | 5/2002 | Scott et al. | 707/1 |
| 2002/0059267 A1 | 5/2002 | Shah | 707/100 |
| 2002/0078175 A1 | 6/2002 | Wallace | 709/200 |

| Publication No. | Date | Inventor | Class |
|---|---|---|---|
| 2002/0087272 A1 | 7/2002 | Mackie | 702/14 |
| 2002/0091737 A1 | 7/2002 | Markel | 707/513 |
| 2002/0099578 A1 | 7/2002 | Eicher et al. | 705/7 |
| 2002/0099678 A1 | 7/2002 | Albright et al. | 706/45 |
| 2002/0103976 A1 | 8/2002 | Steely et al. | 711/135 |
| 2002/0112171 A1 | 8/2002 | Ginter et al. | 713/185 |
| 2002/0133368 A1 | 9/2002 | Strutt et al. | 705/1 |
| 2002/0147803 A1 | 10/2002 | Dodd et al. | 709/223 |
| 2002/0161614 A1 | 10/2002 | Spira et al. | 705/7 |
| 2002/0169658 A1 | 11/2002 | Adler | 705/10 |
| 2002/0169799 A1 | 11/2002 | Voshell | 707/503 |
| 2002/0177784 A1 | 11/2002 | Shekhar | 600/519 |
| 2002/0178119 A1 | 11/2002 | Griffin et al. | 705/54 |
| 2002/0184043 A1 | 12/2002 | Lavorgna et al. | 705/1 |
| 2002/0184061 A1 | 12/2002 | Digate et al. | 705/7 |
| 2002/0188513 A1 | 12/2002 | Gil et al. | 705/22 |
| 2002/0194042 A1 | 12/2002 | Sands | 705/7 |
| 2002/0194090 A1 | 12/2002 | Gagnon et al. | 705/27 |
| 2002/0194329 A1 | 12/2002 | Alling | 709/224 |
| 2002/0198985 A1 | 12/2002 | Fraenkel et al. | 709/224 |
| 2003/0004742 A1 | 1/2003 | Palmer et al. | 705/1 |
| 2003/0014290 A1 | 1/2003 | McLean et al. | 705/7 |
| 2003/0014488 A1 | 1/2003 | Dalal et al. | 709/204 |
| 2003/0028419 A1 | 2/2003 | Monaghan | 705/10 |
| 2003/0033191 A1 | 2/2003 | Davies et al. | 705/10 |
| 2003/0040936 A1 | 2/2003 | Nader et al. | 705/1 |
| 2003/0055731 A1 | 3/2003 | Fouraker et al. | 705/22 |
| 2003/0055927 A1 | 3/2003 | Fischer et al. | 709/221 |
| 2003/0061132 A1 | 3/2003 | Yu et al. | 705/30 |
| 2003/0065604 A1 | 4/2003 | Gatto | 705/36 |
| 2003/0065605 A1 | 4/2003 | Gatto | 705/36 |
| 2003/0069773 A1 | 4/2003 | Hladik et al. | 705/7 |
| 2003/0069824 A1 | 4/2003 | Menninger | 705/37 |
| 2003/0071814 A1 | 4/2003 | Jou et al. | 345/440 |
| 2003/0078830 A1 | 4/2003 | Wagner et al. | |
| 2003/0093423 A1 | 5/2003 | Larason et al. | 707/5 |
| 2003/0110249 A1 | 6/2003 | Buus et al. | 709/224 |
| 2003/0144868 A1 | 7/2003 | MacIntyre et al. | 705/1 |
| 2003/0146937 A1 | 8/2003 | Lee | 345/781 |
| 2003/0149696 A1 | 8/2003 | Nelson et al. | |
| 2003/0182181 A1 | 9/2003 | Kirkwood | 705/11 |
| 2003/0187675 A1 | 10/2003 | Hack | 705/1 |
| 2003/0195878 A1 | 10/2003 | Neumann | 707/3 |
| 2003/0204430 A1 | 10/2003 | Kalmick et al. | 705/8 |
| 2003/0204487 A1 | 10/2003 | Sssv | 707/1 |
| 2003/0212960 A1 | 11/2003 | Shaughnessy et al. | 715/526 |
| 2003/0225604 A1 | 12/2003 | Casati et al. | 705/7 |
| 2003/0226107 A1 | 12/2003 | Pelegri-Llopart | 707/501.1 |
| 2003/0236732 A1 | 12/2003 | Cimral et al. | 705/36 |
| 2004/0021695 A1 | 2/2004 | Sauermann et al. | 345/789 |
| 2004/0030741 A1 | 2/2004 | Wolton et al. | 709/202 |
| 2004/0030795 A1* | 2/2004 | Hesmer et al. | 709/231 |
| 2004/0033475 A1 | 2/2004 | Mizuma et al. | 434/219 |
| 2004/0044665 A1 | 3/2004 | Nwabueze | 707/9 |
| 2004/0044678 A1 | 3/2004 | Kalia et al. | 707/102 |
| 2004/0059518 A1 | 3/2004 | Rothschild | 702/18 |
| 2004/0064293 A1 | 4/2004 | Hamilton et al. | 702/182 |
| 2004/0066782 A1 | 4/2004 | Nassar | 370/389 |
| 2004/0068429 A1 | 4/2004 | MacDonald | 705/10 |
| 2004/0068431 A1 | 4/2004 | Smith et al. | 705/10 |
| 2004/0083246 A1 | 4/2004 | Kahlouche et al. | 708/105 |
| 2004/0093296 A1 | 5/2004 | Phelan et al. | 705/396 R |
| 2004/0102926 A1 | 5/2004 | Adendorff | 702/182 |
| 2004/0117731 A1 | 6/2004 | Blyashov | 715/507 |
| 2004/0119752 A1 | 6/2004 | Berringer et al. | 345/779 |
| 2004/0128150 A1 | 7/2004 | Lundegren | 705/1 |
| 2004/0135825 A1 | 7/2004 | Brosnan | 345/623 |
| 2004/0138944 A1 | 7/2004 | Whitacre et al. | 705/11 |
| 2004/0162772 A1 | 8/2004 | Lewis | 705/34 |
| 2004/0164983 A1 | 8/2004 | Khozai | 345/440 |
| 2004/0172323 A1 | 9/2004 | Stamm | 705/10 |
| 2004/0183800 A1 | 9/2004 | Peterson | 345/440 |
| 2004/0199541 A1 | 10/2004 | Goldberg et al. | 707/104.1 |
| 2004/0204913 A1 | 10/2004 | Mueller et al. | 702/188 |
| 2004/0210574 A1 | 10/2004 | Aponte et al. | 707/5 |
| 2004/0212636 A1 | 10/2004 | Stata et al. | 345/703 |
| 2004/0215626 A1 | 10/2004 | Colossi et al. | 715/500 |
| 2004/0225571 A1 | 11/2004 | Urali | 705/26 |
| 2004/0225955 A1 | 11/2004 | Ly | 715/500 |
| 2004/0230463 A1 | 11/2004 | Boivin | 705/7 |
| 2004/0230471 A1 | 11/2004 | Putnam | 705/10 |
| 2004/0249482 A1 | 12/2004 | Abu El Ata et al. | 700/44 |
| 2004/0249657 A1 | 12/2004 | Koi et al. | 705/1 |
| 2004/0252134 A1 | 12/2004 | Bhatt et al. | 345/619 |
| 2004/0254806 A1 | 12/2004 | Schwerin-Wenzel et al. | 705/1 |
| 2004/0254860 A1 | 12/2004 | Wagner et al. | 705/27 |
| 2004/0260582 A1 | 12/2004 | King | 705/7 |
| 2004/0260717 A1 | 12/2004 | Albornoz et al. | 707/102 |
| 2004/0268228 A1* | 12/2004 | Croney et al. | 715/505 |
| 2005/0004781 A1 | 1/2005 | Price et al. | 702/188 |
| 2005/0012743 A1 | 1/2005 | Kapler | 345/419 |
| 2005/0039119 A1 | 2/2005 | Parks et al. | 715/515 |
| 2005/0049831 A1 | 3/2005 | Lilly | 702/182 |
| 2005/0049894 A1 | 3/2005 | Cantwell et al. | 705/1 |
| 2005/0055257 A1 | 3/2005 | Senturk et al. | 705/8 |
| 2005/0060048 A1 | 3/2005 | Pierre | 700/28 |
| 2005/0060300 A1 | 3/2005 | Stolte et al. | |
| 2005/0060325 A1 | 3/2005 | Bakalash | 707/100 |
| 2005/0065925 A1 | 3/2005 | Weissman et al. | 707/4 |
| 2005/0065930 A1 | 3/2005 | Swaminathan et al. | |
| 2005/0065967 A1 | 3/2005 | Schuetze et al. | 707/102 |
| 2005/0071680 A1 | 3/2005 | Bukary et al. | 713/201 |
| 2005/0071737 A1* | 3/2005 | Adendorff et al. | 715/500 |
| 2005/0091093 A1 | 4/2005 | Bhaskaran | 705/7 |
| 2005/0091253 A1 | 4/2005 | Cragun | 707/102 |
| 2005/0091263 A1 | 4/2005 | Wallace | 707/102 |
| 2005/0097438 A1 | 5/2005 | Jacobson | 715/500.1 |
| 2005/0097517 A1 | 5/2005 | Goin et al. | 717/124 |
| 2005/0108271 A1 | 5/2005 | Hurmiz et al. | 715/202 |
| 2005/0114241 A1 | 5/2005 | Hirsch | 705/35 |
| 2005/0114801 A1 | 5/2005 | Yang | 715/961 |
| 2005/0144022 A1 | 6/2005 | Evans | 705/1 |
| 2005/0149558 A1 | 7/2005 | Zhuk | 707/104.1 |
| 2005/0149852 A1 | 7/2005 | Bleicher | 715/501.1 |
| 2005/0154628 A1 | 7/2005 | Eckart et al. | 705/10 |
| 2005/0154635 A1 | 7/2005 | Wright et al. | 705/11 |
| 2005/0154769 A1 | 7/2005 | Eckart et al. | 707/201 |
| 2005/0160356 A1 | 7/2005 | Albornoz | 715/512 |
| 2005/0171835 A1 | 8/2005 | Mook | 705/11 |
| 2005/0181835 A1 | 8/2005 | Lau et al. | 455/567 |
| 2005/0197946 A1 | 9/2005 | Williams et al. | 705/36 |
| 2005/0198042 A1 | 9/2005 | Davis | 707/10 |
| 2005/0203876 A1 | 9/2005 | Cragun et al. | 707/3 |
| 2005/0209943 A1 | 9/2005 | Ballow et al. | 705/35 |
| 2005/0209945 A1 | 9/2005 | Ballow et al. | 705/35 |
| 2005/0209946 A1 | 9/2005 | Ballow et al. | 705/35 |
| 2005/0209948 A1 | 9/2005 | Ballow et al. | 705/36 |
| 2005/0210052 A1 | 9/2005 | Aldridge | 707/101 |
| 2005/0216831 A1 | 9/2005 | Guzik | 715/513 |
| 2005/0228880 A1 | 10/2005 | Champlin | 709/224 |
| 2005/0240467 A1 | 10/2005 | Eckart | 705/10 |
| 2005/0240898 A1 | 10/2005 | Mankotia et al. | 717/101 |
| 2005/0256825 A1 | 11/2005 | Dettinger | 707/1 |
| 2005/0262051 A1 | 11/2005 | Dettinger et al. | 707/3 |
| 2005/0262451 A1 | 11/2005 | Remignanti et al. | 715/833 |
| 2005/0272022 A1 | 12/2005 | Montz, Jr. et al. | 434/322 |
| 2005/0273762 A1 | 12/2005 | Lesh | 715/115 |
| 2005/0289452 A1 | 12/2005 | Kashi | 715/512 |
| 2006/0004555 A1 | 1/2006 | Jones | 703/6 |
| 2006/0004731 A1 | 1/2006 | Seibel et al. | 707/3 |
| 2006/0009990 A1 | 1/2006 | McCormick | 705/1 |
| 2006/0010032 A1 | 1/2006 | Eicher et al. | 705/10 |
| 2006/0010164 A1 | 1/2006 | Netz et al. | 707/104.1 |
| 2006/0020531 A1 | 1/2006 | Veeneman et al. | 705/35 |
| 2006/0026179 A1 | 2/2006 | Brown et al. | 707/100 |
| 2006/0036163 A1 | 2/2006 | Prasad | 715/1 |
| 2006/0036595 A1 | 2/2006 | Gilfix et al. | 707/5 |
| 2006/0047419 A1* | 3/2006 | Diendorf et al. | 701/208 |
| 2006/0059107 A1 | 3/2006 | Elmore et al. | 705/64 |
| 2006/0074789 A1 | 4/2006 | Capotosto et al. | 705/35 |
| 2006/0080156 A1 | 4/2006 | Baughn et al. | 705/7 |
| 2006/0085444 A1 | 4/2006 | Sarawgi et al. | 707/100 |
| 2006/0089868 A1 | 4/2006 | Griller et al. | 705/10 |
| 2006/0089894 A1 | 4/2006 | Balk et al. | 705/35 |
| 2006/0089939 A1 | 4/2006 | Broda et al. | 707/100 |
| 2006/0095276 A1 | 5/2006 | Axelrod et al. | 705/1 |
| 2006/0095915 A1 | 5/2006 | Clater | 718/100 |
| 2006/0111921 A1 | 5/2006 | Chang et al. | 705/1 |

| | | | |
|---|---|---|---|
| 2006/0112123 A1 | 5/2006 | Clark et al. | 707/101 |
| 2006/0112130 A1 | 5/2006 | Lowson | 707/102 |
| 2006/0123022 A1 | 6/2006 | Bird | 707/100 |
| 2006/0136830 A1 | 6/2006 | Martlage et al. | 715/745 |
| 2006/0154692 A1 | 7/2006 | Ikehara et al. | 455/556.2 |
| 2006/0161471 A1 | 7/2006 | Hulen et al. | 705/10 |
| 2006/0161596 A1 | 7/2006 | Chan et al. | 707/201 |
| 2006/0167704 A1 | 7/2006 | Nicholls et al. | 705/1 |
| 2006/0178897 A1 | 8/2006 | Fuchs | 705/1 |
| 2006/0178920 A1 | 8/2006 | Muell | 705/8 |
| 2006/0195424 A1 | 8/2006 | Wiest et al. | 707/3 |
| 2006/0206392 A1 | 9/2006 | Rice, Jr. et al. | 705/26 |
| 2006/0224325 A1 | 10/2006 | Conway et al. | 702/19 |
| 2006/0229925 A1 | 10/2006 | Chalasani et al. | 705/8 |
| 2006/0230234 A1 | 10/2006 | Bentolila et al. | 711/133 |
| 2006/0233348 A1 | 10/2006 | Cooper | 379/265.06 |
| 2006/0235732 A1 | 10/2006 | Miller et al. | 705/7 |
| 2006/0235778 A1 | 10/2006 | Razvi et al. | 705/35 |
| 2006/0253475 A1 | 11/2006 | Stewart et al. | 707/100 |
| 2006/0259338 A1 | 11/2006 | Rodrigue et al. | 705/7 |
| 2006/0265377 A1 | 11/2006 | Raman et al. | 707/9 |
| 2006/0271583 A1 | 11/2006 | Hulen et al. | 707/102 |
| 2006/0277128 A1 | 12/2006 | Anandarao et al. | |
| 2006/0282819 A1 | 12/2006 | Graham et al. | 717/113 |
| 2006/0288211 A1 | 12/2006 | Vargas et al. | 713/170 |
| 2007/0021992 A1 | 1/2007 | Konakalla | 705/7 |
| 2007/0022026 A1 | 1/2007 | Davidson et al. | 705/31 |
| 2007/0033129 A1 | 2/2007 | Coates | 705/36 R |
| 2007/0038934 A1* | 2/2007 | Fellman | 715/700 |
| 2007/0050237 A1 | 3/2007 | Tien et al. | 705/11 |
| 2007/0055564 A1 | 3/2007 | Fourman | 705/11 |
| 2007/0055688 A1 | 3/2007 | Blattner | 707/102 |
| 2007/0067381 A1 | 3/2007 | Grant et al. | 709/200 |
| 2007/0112607 A1 | 5/2007 | Tien et al. | 705/7 |
| 2007/0143161 A1 | 6/2007 | Tien et al. | 705/7 |
| 2007/0143174 A1 | 6/2007 | Tien et al. | 705/11 |
| 2007/0143175 A1 | 6/2007 | Tien et al. | 705/11 |
| 2007/0156680 A1 | 7/2007 | Tien et al. | 707/6 |
| 2007/0168323 A1 | 7/2007 | Dickerman et al. | 707/2 |
| 2007/0174330 A1 | 7/2007 | Fox et al. | 707/102 |
| 2007/0225986 A1* | 9/2007 | Bowe et al. | 705/1 |
| 2007/0234198 A1 | 10/2007 | Tien et al. | 715/512 |
| 2007/0239508 A1 | 10/2007 | Fazal et al. | 705/8 |
| 2007/0239573 A1 | 10/2007 | Tien et al. | 705/35 |
| 2007/0239660 A1 | 10/2007 | Tien et al. | 707/2 |
| 2007/0254740 A1 | 11/2007 | Tien et al. | 463/42 |
| 2007/0255681 A1 | 11/2007 | Tien et al. | 707/2 |
| 2007/0260625 A1 | 11/2007 | Tien et al. | 707/101 |
| 2007/0265863 A1 | 11/2007 | Tien et al. | 705/1 |
| 2007/0266042 A1 | 11/2007 | Hsu et al. | 707/102 |
| 2007/0282673 A1 | 12/2007 | Nagpal et al. | 705/11 |
| 2008/0005064 A1 | 1/2008 | Sarukkai | 707/3 |
| 2008/0040309 A1 | 2/2008 | Aldridge | 707/1 |
| 2008/0059441 A1 | 3/2008 | Gaug et al. | 707/4 |
| 2008/0086345 A1 | 4/2008 | Wilson et al. | 705/7 |
| 2008/0086359 A1 | 4/2008 | Holton et al. | 705/10 |
| 2008/0109270 A1 | 5/2008 | Shepherd et al. | 705/7 |
| 2008/0115103 A1 | 5/2008 | Datars et al. | 717/101 |
| 2008/0140623 A1 | 6/2008 | Tien et al. | 707/3 |
| 2008/0162209 A1 | 7/2008 | Gu et al. | 705/7 |
| 2008/0162210 A1 | 7/2008 | Gu et al. | 705/7 |
| 2008/0163066 A1 | 7/2008 | Gu et al. | 715/738 |
| 2008/0163099 A1 | 7/2008 | Gu et al. | 715/780 |
| 2008/0163125 A1 | 7/2008 | Gu et al. | 715/853 |
| 2008/0163164 A1 | 7/2008 | Chowdhary et al. | 717/106 |
| 2008/0168376 A1 | 7/2008 | Tien et al. | 715/772 |
| 2008/0172287 A1 | 7/2008 | Tien et al. | 705/10 |
| 2008/0172348 A1 | 7/2008 | Tien et al. | 706/12 |
| 2008/0172414 A1 | 7/2008 | Tien et al. | 707/104.1 |
| 2008/0172629 A1 | 7/2008 | Tien et al. | 715/771 |
| 2008/0183564 A1 | 7/2008 | Tien et al. | 705/11 |
| 2008/0184099 A1 | 7/2008 | Tien et al. | 715/209 |
| 2008/0189632 A1 | 8/2008 | Tien et al. | 715/764 |
| 2008/0189724 A1 | 8/2008 | Tien et al. | 719/329 |
| 2008/0243597 A1 | 10/2008 | Ballow et al. | 705/11 |
| 2008/0288889 A1 | 11/2008 | Hunt et al. | 705/810 |
| 2009/0300110 A1 | 12/2009 | Chene et al. | 709/203 |
| 2010/0262659 A1 | 10/2010 | Christiansen et al. | 709/205 |
| 2012/0150905 A1 | 6/2012 | Tien et al. | |

FOREIGN PATENT DOCUMENTS

| | | |
|---|---|---|
| EP | 1050829 A2 | 3/2006 |
| WO | WO 97/31320 A1 | 8/1997 |
| WO | WO 01/01206 A2 | 1/2001 |
| WO | WO 01/01206 A3 | 1/2001 |
| WO | WO 01/65349 A1 | 9/2001 |
| WO | WO 01/69421 A2 | 9/2001 |
| WO | WO 01/69421 A3 | 9/2001 |
| WO | WO 03/037019 A1 | 5/2003 |
| WO | WO 2004/114177 A2 | 12/2004 |
| WO | WO 2004/114177 A3 | 12/2004 |
| WO | WO 2005/062201 A1 | 7/2005 |
| WO | WO 2005/072410 A2 | 8/2005 |
| WO | WO 2005/101233 | 10/2005 |

OTHER PUBLICATIONS

"Centralization and Optimization of Performance Metrics, Data Sources, and Analysis Activities", 2005 Computerworld Honors Case Study, http://www.cwhonors.org/laureates/Business/20055240.pdf, printed Mar. 7, 2006, 4 pp.

"Chapter—OLAP Services", SQL Server 7.0 Resource Guide, 2006 Microsoft Corporation, http://www.microsoft.com/technet/prodtechnol/sq1/70/reskit/part9/sqc12.mspx, printed Mar. 6, 2006, 18 pp.

"Cognos 8 Business Intelligence Overview", Cognos Incorporated, http://www.cognos.com/products/cognos8businessintelligence/index.html, printed Jan. 11, 2006, 1 pp.

"CorVu Products", Seabrook, http://www.seabrook.ie/corvu.htm#corvurapidscorecard, printed Mar. 7, 2006, 3 pp.

"Enhanced Vendor Scorecards Vendor Documentation", Publix Super Markets, Inc., copyright 2003, revised date Feb. 9, 2004, http://my.datexx.com/www/customer/p14/Vendor%20EVS%20Documentation.pdf, 25 pp.

"Epicor Vantage: Introducing the Next Generation Global Enterprise Resource Planning Software", Epicor Vantage, http://www.scala.com.cn/downloads/vantage/vantage_60_page.pdf, printed Jan. 12, 2006, 60 pp.

"Extend Business Scorecard Manager 2005", ProClarity, http://www.proclarity.com/products/clients_scorecardmanager.asp, printed Jan. 11, 2006, 2 pp.

"Microsoft Office Business Scorecard Manager 2005 Overview and Benefits", Microsoft Corporation, http://www.office.microsoft.com/en-us/assistance/HA012225141033.aspx, printed Jan. 11, 2006, 3 pp.

"MicroStrategy: Best in Business Intelligence", MicroStrategy Inc., http://www.microstrategy.com/Software/Products/User-Interfaces/Web, printed Jan. 11, 2006, 3 pp.

"OutlookSoft CPM: A Unified Corporate Performance Management Solution", OutlookSoft Corporation, http://www.outlooksoft.com/product.index.htm, printed Jan. 11, 2006, 2 pp.

"SBM Solutions: Product Guide", SBM Associates, http://www.productcosting.com/prodguide.htm, printed Feb. 28, 2006, 1 pp.

"Scorecarding with Cognos® Metrics Manager", Congros, http://www.cognos.com/pdfs/factsheets/fs_scorcarding_with_cognos_metrics_manager.pdf, printed Mar. 7, 2006, 4 pp.

"The Balanced Scorecard", http://cc.msncache.com/cache.aspx?q=2846702033267&lang=en-US&mkt=en-US&FORM=CVRE3, 4 pp.

Badii, Atta et al., "Information Management and Knowledge Integration for Enterprise Innovation", Logistics Information Management, vol. 16, No. 2, 2003, http://www.emeraldinsight.com/Insight/ViewContentServlet?Filename=Published/EmeraldFullTextArticle/Pdf/0880160205.pdf, pp. 145-155.

Bajwa, Deepinder S. et al., "An Empirical Assessment of the Adoption and Use of Collaboration Information Technologies in the U.S., Australia, and Hong Kong", http://dsslab.sims.monash.edu.au/dss2004/proceedings/pdf/07_Bajwa_Lewis_Pervan_Lai.pdf, printed Jan. 12, 2006, copyright 2004, pp. 60-69.

Bird, Steven et al., "Annotation Graphs as a Framework for Multidimensional Linguistic Data Analysis", http:///ac1.ldc.upenn.educ/W/W99/W99-0301.pdf, printed Jan. 12, 2006, pp. 1-10.

Calame, Paul et al., "Cockpit: Decision Support Tool for Factory Operations and Supply Chain Management", Intel Technology Journal Q1, 2000 Intel Corporation, http://developer.intel.com/technology/itj/q12000/pdf.cockpit.pdf, pp. 1-13.

Elmanova, Natalia, "Implementing OLAP in Delphi Applications", http://www.only4gurus.net/miscellaneous/implementing_olap_in_delphi_a.doc, printed Mar. 6, 2006, 19 pp.

Ferguson, Mike, "Conquering CPM and Business Intelligence", Business Intelligence.com, ITNews265, http://www.businessintelligence.com/ex/asp.code.21/xe/article.htm, printed Nov. 11, 2006, 6 pp.

Lebow, David G. et al., "HyLighter: An Effective Interactive Annotation Innovation for Distance Education", http://wwwuwex.edu/disted/conference/Resource_library/proceedings/04_1344.pdf, printed Jan. 12, 2006, 5 pp.

Rother, Kristian et al., "Multidimensional Data Integration of Protein Annotations", Springer-Verlag GmbH, http://www.springerlink.com/(3riocx450rr2iv55x2txum55)/app/home/contribution.asp?referrer=parent&backto=issue,11,15;journal,827,2337;linkingpublicationresults,1:105633,1, printed Jan. 12, 2006, 2 pp.

Sanders, Paul, "SQL Server 2005: Real-Time Business Intelligence Using Analysis Services", Microsoft Corporation, Apr. 1, 2005, http://www.microsoft.com/technet/prodtechnol/sq1/2005/rtbissas.mspx, printed Jan. 11, 2006, 9 pp.

Zaidi, Omar et al., "Data Center Consolidation: Using Performance Metrics to Achieve Success", http://searchnetworking.techtarget.com/searchNetworking/Downloads/IV_INS_DataCenter_Consolidation_WP.pdf, printed Jan. 12, 2006, 10 pp.

Acharya, Sharad, "Pattern Language for Data Driven Presentation Layer for Dynamic and Configurable Web Systems," Version: Conference Draft, Jul. 26, 2004, pp. 1-33, http://hillside.net/plop/2004/papers/sacharya0/PLoP2004_sacharya0_0.pdf.

"Data Driven Components," Java Developers Journal, SYS-CON Media, Inc. 2004, http://www2.sys-con.com/itsg/virtualed/Java/archives/0405/hyrkas/index.html, 7 pp.

"Hyperion Intelligence Desktop, Plugin, and HTML Client Products," Hyperion™ Developer Network, http://dev.hyperion.com/resource_library/articles/intelligence_desktop_article.cfm, 7 pp.

"BusinessObjects Enterprise 6," An End-to-End Overview, White Paper., http://www.spain.businessobjects.com/global/pdf/products/queryanalysis/wp_e6_overview.pdf, 20 pp.

"Cognos 8 Business Intelligence—Dashboards," COGNOS® The Next Level of Performance, http://www.cognos.com/products/cognos8businessintelligence/dashboards.html, 2 pp.

"Microsoft Builds Business Intelligence Into Office Software," Microsoft PressPass—Information for Journalists, http://www.microsoft.com/presspass/press/2005/oct05/10-23BiLalunchPR.mspx, 4 pp.

"Hyperion System₉ BI+Enterprise Metrics," A Hyperion Data Sheet, Hyperion Solutions Corporation Worldwide Headquarters, Oct. 2006, http://www.hperion.com/products/resource_library/product_collateral/EnterpriseMetrics.pdf, pp. 1-2.

"Products: PilotWorks," Products: PilotWorks—Scorecard, 2006 Pilot Software, pp. 1-3.

"Reveleus Business Analytics," Reveleus, an i-flex businedss, pp. 1-4.

Batista, Gustavo E.A.P.A.; Monard, Maria Carolina; "An Analysis of Four Missing Data Treatment Methods for Supervised Learning," University of Sao Paulo, Institute of Mathematics and Computer Science (ICMC), http://coblitz.codeen.org:,3125/citeseer.ist.psu.edu/cache/papers/cs/27545/http:zSzzSzwww.icmc.usp.brzSz~gbatistazSzpdfszSzaai2003.pdf/batista03analysis.pdf, 12 pp.

"Crystal Xcelsius Workgroup." http://www.xcelsius.com/Products/Enterprise_feastures.html, 3 pp.

"Reporting and Dashboards with Cognos 8 Business Intelligence," Cognos, The Next Level of Intelligence, http://www.cognos.com/pdfs/whitepapers/wp_reporting_and_dashboards_with_c8bi.pdf, pp. 1-16.

"BusinessObjects Plan Dashboarding XI for Retail," BusinessObjects, http://www.businessobjects.com/pdf/products/planning/plan_dashboarding_rt.pdf, 2 pp.

"SAS® Risk Intelligence Offerings, Risk Reporting; Data Integration; Internal Risk Ratings; Credit Risk; Market Risk; Operational Risk", http://www.sas.com/industry/fsi/risk/brochure2pdf, 12 pp.

Tenhunen, Jarkko; Ukko, Juhani; Markus, Tapio; Rantanen, Hannu; "Applying Balanced Scorecard Principles on the SAKE-System: Case Telekolmio Oy," Lappeenranta University of Technology (Department of Industrial Engineering and Management); Telekolmio Oy (Finland). http://www.lut.fi/tuta/lahti/sake/IWPM2003a.pdf, 11 pp.

Kleijnen, Jack; Smits, Martin T.; "Performance Metrics in Supply Chain Management," Tilburg University, The Netherlands, Department of Information Systems and Management. http://center.kub.nl/staff/kleijnen/jors-proofs.pdf, 8 pp.

Martinsons, Maris; Davison, Robert; Tse, Dennis; "The Balanced Scorecard: A Foundation for the Strategic Management of Information Systems," University of Hong Kong, Sep. 28, 1998. http://teaching.fec.anu.edu.au/BUSN7040/Articles/Martinsons%20et%20al%201999%20DSS%20the%20balanced%20scorecard.pdf, 18 pp.

U.S. Office Action mailed Jul. 25, 2008 cited in U.S. Appl. No. 11/412,434.

U.S. Office Action mailed Sep. 5, 2008 cited in U.S. Appl. No. 11/280,548.

U.S. Office Action dated Nov. 24, 2008 cited in U.S. Appl. No. 11/214,678.

U.S. Official Action mailed Dec. 24, 2008 in U.S. Appl. No. 11/624,171.

U.S. Office Action dated Feb. 18, 2009 cited in U.S. Appl. No. 11/412,434.

U.S. Official Action mailed May 28, 2009 in U.S. Appl. No. 11/280,548.

U.S. Official Action mailed Jun. 3, 2009 in U.S. Appl. No. 11/393,335.

U.S. Official Action mailed Aug. 19, 2009 in U.S. Appl. No. 11/393,115.

U.S. Official Action mailed Sep. 1, 2009 in U.S. Appl. No. 11/412,434.

U.S. Official Action mailed Sep. 2, 2009 in U.S. Appl. No. 11/624,171.

U.S. Official Action mailed Sep. 30, 2009 in U.S. Appl. No. 11/214,678.

IndicatorBarometer; retrieved from <http://www.aiqsystems.com/docs/ref_7.pdf>, archived Oct. 15, 2004.

U.S. Official Action mailed Jan. 22, 2010 in U.S. Appl. No. 11/039,714.

Chien et al., XML Document Versioning, SIGMOD Record, vol. 30, No. 3, Sep. 2001.

U.S. Official Action mailed Mar. 17, 2010 in U.S. Appl. No. 11/280,548.

U.S. Official Action mailed Mar. 25, 2010 in U.S. Appl. No. 11/393,115.

U.S. Official Action mailed Mar. 30, 2010 in U.S. Appl. No. 11/313,390.

U.S. Official Action mailed Mar. 31, 2010 in U.S. Appl. No. 11/313,327.

U.S. Official Action mailed Apr. 1, 2010 in U.S. Appl. No. 11/313,899.

U.S. Official Action mailed Apr. 7, 2010 in U.S. Appl. No. 11/412,499.

Cognos Incorporated, "Scorecarding with Cognos Metrics Manager," Oct. 2004.

Charles Bloomfield, "Bringing the Balanced Scorecard to Life: The Microsoft Balanced Scorecard Framework," Microsoft Corporation White Paper, May 2002.

Mulins, Craig S., "Distributed Query Optimization Technical Support", Jul. 1996.

Callen, Daniel J. et al., "Consolidation of Query Results in a Multidatabase Environment: An Object Oriented Approach'" IEEE, 1996.

U.S. Official Action mailed Apr. 14, 2010 in U.S. Appl. No. 11/313,324.

U.S. Official Action mailed Apr. 15, 2010 in U.S. Appl. No. 11/412,458.

U.S. Official Action mailed Apr. 23, 2010 in U.S. Appl. No. 11/214,678.
U.S. Official Action mailed May 12, 2010 in U.S. Appl. No. 11/624,171.
U.S. Official Action mailed May 26, 2010 in U.S. Appl. No. 11/393,335.
Ergometrics.com Web Pages, Ergometrics, Feb.-Mar. 2000, Retrieved from Archive.org Jan. 25, 2007.
Arnold, Tom, Dashboard & Scorecard Software—Tools for Operations Management and Strategy Deployment, Sep. 18, 2002.
iDashes.net Web Pages, iDashes, Inc., May 2001, Retrieved from Archive.org Jan. 25, 2007.
IBM WebSphere: Chapter 6—Working with WebSphere Business Modeler, cited in U.S. Appl. No. 11/313,390 in OA dated Sep. 1, 2010, 20 pgs.
U.S. Official Action mailed Aug. 4, 2010 in U.S. Appl. No. 11/280,548.
U.S. Official Action mailed Aug. 5, 2010 in U.S. Appl. No. 11/412,458.
U.S. Official Action mailed Aug. 10, 2010 in U.S. Appl. No. 11/623,818.
U.S. Official Action mailed Aug. 30, 2010 in U.S. Appl. No. 11/313,327.
U.S. Official Action mailed Sep. 1, 2010 in U.S. Appl. No. 11/313,390.
U.S. Official Action mailed Sep. 8, 2010 in U.S. Appl. No. 11/670,516.
U.S. Official Action mailed Jul. 21, 2010 in U.S. Appl. No. 11/039,714.
Monson et al., "IBM Workplace for Business Controls and Reporting: Administration and Operations Best Practices", IBM Redpaper, Oct. 2005, pp. 1-240.
"Cognos Business Intelligence Series 7, Cognos Impromptu (2006), Mastering Impromptu Reports", Cognos Incorporated, pp. 1-154.
"Cognos Series 7 PowerPlay Transformer", (2003), Installation Guide, Cognos Incorporated, pp. 1-62.
"Cognos Business Intelligence Series Cognos PowerPlay for Windows (2006), Discovering PowerPlay", Cognos Incorporated, pp. 1-74.
"Cognos Business Intelligence Series 7 PowerPlay for Windows", (2006), PowerPlay User Guide, Cognos Incorporated, pp. 1-230.
"Epicor Vantage: Introducing the Next Generation Global Enterprise Resource Planning Software", Epicore Vantage, http://m.scala.com.cn'downloads/vantage/vantage6Oage.pdf, printed Jan. 12, 2006, 60 pgs.
T. E. Graedel et al., "Hierarchical Metrics for Sustainability", Environmental Quality Management, Winter, 2002, vol. 12 Issue 12, pp. 21-30, Retrieved from Business Source Complete Database.
U.S. Official Action mailed Nov. 5, 2010 in U.S. Appl. No. 11/393,335.
U.S. Official Action mailed Nov. 10, 2010 in U.S. Appl. No. 11/624,122.
U.S. Official Action mailed Nov. 10, 2010 in U.S. Appl. No. 11/668,763.
U.S. Official Action mailed Nov. 24, 2010 in U.S. Appl. No. 11/670,444.
U.S. Official Action mailed Dec. 8, 2010 in U.S. Appl. No. 11/214,678.
"SYSPRO Offers Executive Dashboard with SYSPRO e.net Solutions"; Business Wire, Oct. 11, 2004.
Park et al., Role-Based Access Control on the Web; ACM Transactions on Information and System Security, vol. 4, No. 1, Feb. 2001.
"Microsoft Office Business Scorecard Manager"; Microsoft, 2003.
"Microsoft Takes Up Scorecarding; Performance Management app aims to Maximize Office"; eWeek, Oct. 31, 2005.
Tedeschi, Digital Cockpits are a Faster, Much Closer Way of Tracking Performance in a Corporation's Every Corner; New York Times, Jul. 29, 2002.
Havenstein; "BI Reporting Tools Improve"; InfoWorld, vol. 25, No. 45, Nov. 17, 2003.
U.S. Official Action mailed Jan. 6, 2011 in U.S. Appl. No. 11/313,324.
U.S. Official Action mailed Jan. 11, 2011 in U.S. Appl. No. 11/412,458.
U.S. Official Action mailed Jan. 25, 2011 in U.S. Appl. No. 11/280,548.
U.S. Official Action mailed Feb. 1, 2011 in U.S. Appl. No. 11/670,516.
U.S. Official Action mailed Mar. 1, 2011 in U.S. Appl. No. 11/412,499.
U.S. Official Action mailed Mar. 2, 2011 in U.S. Appl. No. 11/624,122.
U.S. Official Action mailed Mar. 4, 2011 in U.S. Appl. No. 11/668,763.
U.S. Official Action mailed Apr. 1, 2011 in U.S. Appl. No. 11/313,899.
U.S. Official Action mailed Apr. 4, 2011 in U.S. Appl. No. 11/624,171.
U.S. Official Action mailed Apr. 12, 2011 in U.S. Appl. No. 11/623,953.
U.S. Official Action mailed May 10, 2011 in U.S. Appl. No. 11/393,335.
U.S. Appl. No. 13/404,032, filed Feb. 24, 2012 entitled "Concerted Coordination of Multidimensional Scorecards".
U.S. Official Action mailed Mar. 5, 2012 in U.S. Appl. No. 11/623,953.
U.S. Official Action mailed Jul. 6, 2011 in U.S. Appl. No. 11/214,678.
U.S. Official Action mailed Jul. 14, 2011 in U.S. Appl. No. 11/668,763.
U.S. Official Action mailed Aug. 8, 2011 in U.S. Appl. No. 11/313,324.
U.S. Official Action mailed Oct. 24, 2011 in U.S. Appl. No. 11/393,335.
U.S. Official Action mailed Nov. 8, 2011 in U.S. Appl. No. 11/670,516.
U.S. Official Action mailed Nov. 9, 2011 in U.S. Appl. No. 11/623,818.
U.S. Official Action mailed Nov. 10, 2011 in U.S. Appl. No. 11/627,640.
U.S. Official Action mailed Nov. 28, 2011 in U.S. Appl. No. 11/668,763.
U.S. Official Action mailed Dec. 1, 2011 in U.S. Appl. No. 11/670,444.
U.S. Official Action mailed Dec. 12, 2011 in U.S. Appl. No. 11/313,899.
U.S. Official Action mailed Jan. 4, 2012 in U.S. Appl. No. 11/280,548.
U.S. Official Action mailed May 18, 2011 in U.S. Appl. No. 11/670,444.
U.S. Official Action mailed May 23, 2011 in U.S. Appl. No. 11/623,818.
U.S. Official Action mailed Jun. 7, 2011 in U.S. Appl. No. 11/670,516.
U.S. Official Action mailed Jun. 21, 2011 in U.S. Appl. No. 11/408,450.
U.S. Official Action mailed Jun. 24, 2011 in U.S. Appl. No. 11/280,548.
Kraynak, "Absolute Beginner's Guide to Microsoft Office Excel 2003", Que, Sep. 2003, 32 pp.
John Wiley et al., "Power Point All-in-One Desk Reference for Dummies," Jan. 10, 2007.
U.S. Official Action mailed Oct. 21, 2009 in U.S. Appl. No. 11/280,548.
U.S. Official Action mailed Dec. 8, 2009 in U.S. Appl. No. 11/393,335.
U.S. Official Action mailed Dec. 14, 2009 in U.S. Appl. No. 11/393,019.
U.S. Official Action mailed Dec. 28, 2009 in U.S. Appl. No. 11/624,171.
U.S. Official Action mailed Jan. 15, 2010 in U.S. Appl. No. 11/408,450.
U.S. Official Action mailed May 28, 2009 in U.S. Appl. No. 11/214,678.

U.S. Official Action mailed Jun. 19, 2009 in U.S. Appl. No. 11/408,450.
U.S. Official Action mailed Sep. 9, 2010 in U.S. Appl. No. 11/412,499.
U.S. Official Action mailed Sep. 29, 2010 in U.S. Appl. No. 11/313,324.
U.S. Official Action mailed Oct. 6, 2010 in U.S. Appl. No. 11/313,899.
U.S. Official Action mailed Oct. 12, 2010 in U.S. Appl. No. 11/623,953.
U.S. Official Action mailed Mar. 12, 2012 in U.S. Appl. No. 11/627,640.
U.S. Official Action mailed Apr. 20, 2012 in U.S. Appl. No. 11/412,499.
U.S. Official Action mailed May 31, 2012 in U.S. Appl. No. 11/670,444.
U.S. Official Action mailed Jun. 27, 2012 in U.S. Appl. No. 11/313,899.

* cited by examiner

EXAMPLE DESKTOP VISUALIZATION APPLICATION FOR PERFORMANCE METRICS SCREENSHOT

EXAMPLE INDICATOR SELECTION WIZARD SCREENSHOT

SERVICE ARCHITECTURE BASED METRIC VIEWS

BACKGROUND

Key Performance Indicators (KPIs) are quantifiable measurements that reflect the critical success factors of an organization ranging from income that comes from return customers to percentage of customer calls answered in the first minute. Key Performance Indicators may also be used to measure performance in other types of organizations such as schools, social service organizations, and the like. Measures employed as KPI within an organization may include a variety of types such as revenue in currency, growth or decrease of a measure in percentage, actual values of a measurable quantity, and the like.

An average business user may need to visit several data systems before they are able to find the information (such as KPIs, aggregations, metric presentation, and the like) they need. High cost of data access may add overhead to the decision making process, driving up costs and frequency of decisions made on incomplete data and lower overall (Return On Investment) ROI on the data that is collected for the enterprise.

On the other hand, desktop visualization application user interfaces with limited functionality and presentation (e.g. "gadgets" or "widgets") are becoming popular components of operating system desktops. For example, analog or digital clocks, weather presentations, news feeds, and the like are commonly found on many computer users' screens. These user interfaces provide a simple tool for the user to access selected information (e.g. traffic information for a selected area). Use of widgets or gadgets is expanding to numerous areas such as medical information (e.g. doctors can monitor a particular patient's vital information).

SUMMARY

This summary is provided to introduce a selection of concepts in a simplified form that are further described below in the Detailed Description. This summary is not intended to identify key features or essential features of the claimed object matter, nor is it intended as an aid in determining the scope of the claimed subject matter.

Embodiments are directed to providing content to desktop visualization applications ("gadgets") on a user's desktop for delivery of personated and scalable metrics. Configurable user interlaces within a service-based architecture enable users to set up personalized metric views and data delivery attributes. The user interfaces may be coupled with applications that have expanded interaction capability and can provide more detail if requested by the user.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF TOE DRAWINGS

DETAILED DESCRIPTION

As briefly described above, users are enabled to set up limited desktop user interfaces providing personalized and scalable metric information. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general contest of program modules that execute in conjunction with an application program that runs on an operating system on a personal computer, those skilled in the art will recognize that aspects may also be implemented in combination with oilier program modules.

Generally, program module include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Figure 1:
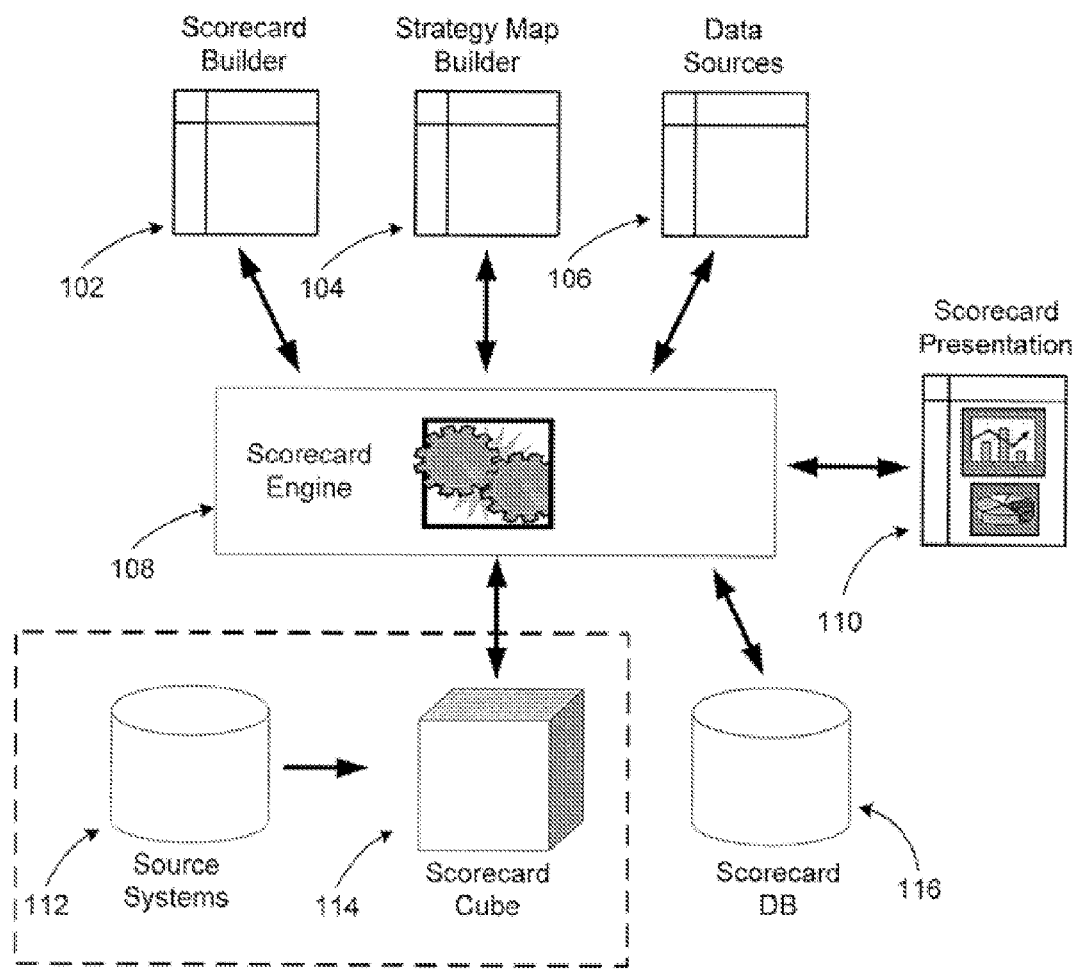
FIG. 1 illustrates an example scorecard architecture.

Referring to FIG. 1, an example scorecard architecture is illustrated. The scorecard architecture may comprise any topology of processing systems, storage, systems, source systems, and configuration systems. The scorecard architecture may also have a static or dynamic topology.

Scorecards are an easy method of evaluating organizational performance. The performance measures may vary from financial data such as sales growth to service information such as customer complaints. In a non-business environment, student performances and teacher assessments may be another example of performance measures that can employ scorecards for evaluating organizational performance. In the exemplary scorecard architecture, a core of the system is scorecard engine 108. Scorecard engine 108 may be an application software that is arranged to evaluate performance metrics. Scorecard engine 108 may be loaded into a server, executed over a distributed network, executed in a client device, and the like.

Data for evaluating various measures may be provided by a data source. The data source may include source systems 112, which provide data to a scorecard cube 114. Source systems 112 may include multi-dimensional databases such OLAP, other databases, individual files, and the like, that provide raw data for generation of scorecards. Scorecard cube 114 is a multi-dimensional database for storing data to be used in determining Key Performance Indicators (KPIs) as well as generated scorecard themselves. As discussed above, the multi-dimensional nature of scorecard cube 114 enables storage, use, and presentation of data over multiple dimensions such as compound performance indicators for different geographic areas, organizational groups, or even for different time intervals. Scorecard cube 114 has a bi-directional interaction wish scorecard engine 108 providing and receiving raw data as well as generated scorecards.

Scorecard database 116 is arranged to operate in a similar manner to scorecard cube 114. In one embodiment, scorecard database 116 may be an external database providing redundant back-up database service.

Scorecard builder 102 may be a separate application or a part of a business logic application such as the performance evaluation application, and the like. Scorecard builder 102 is employed to configure various parameters of scorecard engine 108 such as scorecard elements, default values for actuals, targets, and the like. Scorecard builder 102 may include a user interface such as a web service, a GUI, and the like.

Strategy map builder 104 is employed for a later stage in scorecard generation process. As explained below, scores for KPIs and other metrics may be presented to a user in form of a strategy map. Strategy map builder 104 may include a user interface for selecting graphical formats, indicator elements, and other graphical parameters of the presentation.

Data Sources 106 may be another source for providing raw data to scorecard engine 108. Data sources 106 may also define KPI mappings and other associated data.

Additionally, the scorecard architecture may include scorecard presentation 110. This may be an application to deploy scorecards, customize views, coordinate distribution of scorecard data, and process web-specific applications associated with the performance evaluation process. For example, scorecard presentation 110 may include a web-based printing system, an email distribution system, and the like. In some embodiments, scorecard presentation 110 may be an interface that is used as part of the scorecard engine to export data and/or views to a desktop visualization application enabling visualizations of performance metric (e.g. using composite objects).

Figure 2:
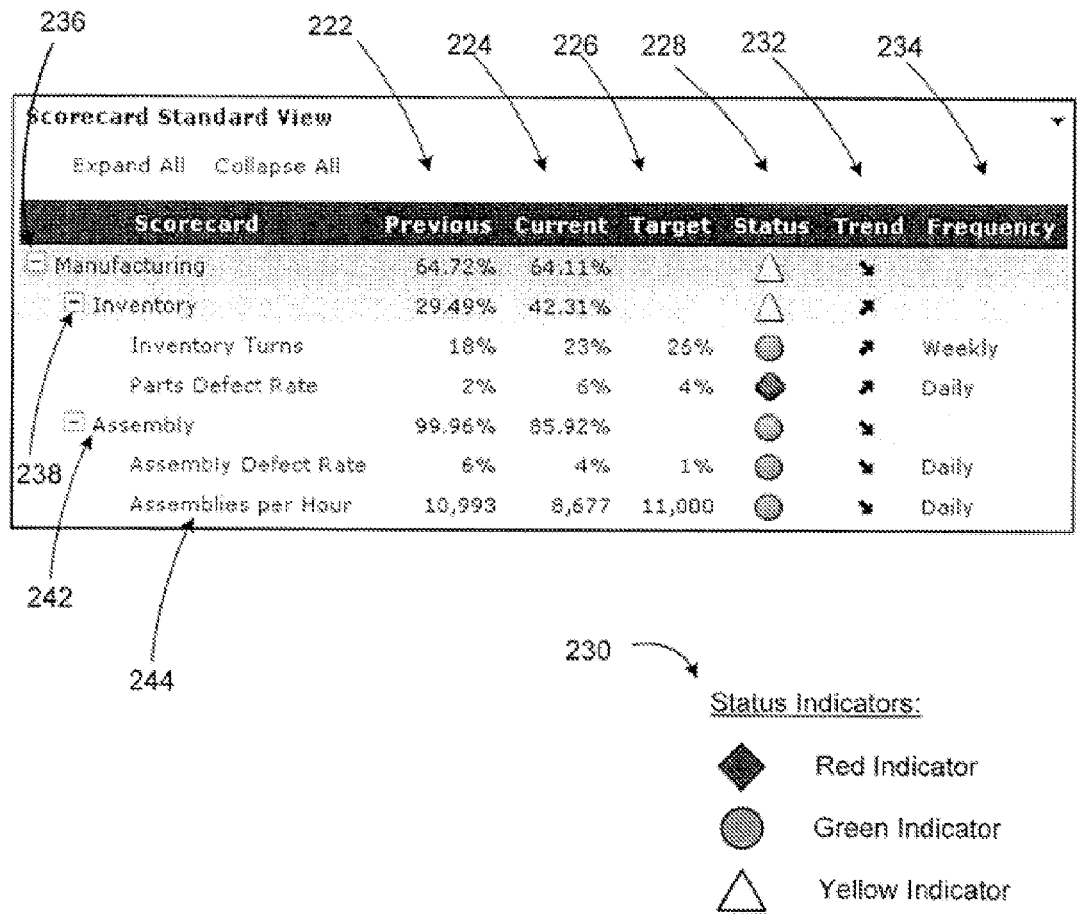
FIG. 2 illustrates a screenshot of an example scorecard.

FIG. 2 illustrates a screenshot of an example scorecard with status indicators 230. As explained before, Key Performance Indicators (KPIs) are specific indicators of organizational performance that measure a current state in relation to meeting the targeted objectives. Decision makers may utilize these indicators to manage the organization more effectively.

When creating a KPI, the KPI definition may be used across several scorecards. This is useful when different scorecard managers might have a shared KPI in common. This may ensure a standard definition is used for that KPI. Despite the shared definition, each individual scorecard may utilize a different data source and data mappings for the actual KPI.

Each KPI may include a number of attributes. Some of these attributes include frequency of data, unit of measure, trend type, weight, and other attributes.

The frequency of data identifies how often the data is updated in the source database (cube). The frequency of data may include: Daily, Weekly, Monthly, Quarterly, and Annually.

The unit of measure provides an interpretation for the KPI. Some of the units of measure are: Integer, Decimal, Percent, Days, and Currency. These examples are not exhaustive, and other elements may be added without departing from the scope of the invention.

A trend type may be set according to whether an increasing trend is desirable or not. For example, increasing profit is a desirable trend, while increasing defect rates is not. The trend type may be used in determining the KPI status to display and ink setting and interpreting the KPI banding boundary values. The arrows displayed in the scorecard of FIG. 2 indicate how the numbers are moving this period compared to last. If in this period the number is greater than last period, the trend is up regardless of the trend type. Possible trend types may include; Increasing Is Better, Decreasing Is Better, and On-Target Is Better.

Weight is a positive integer used to qualify the relative value of a KPI in relation to other KPIs. It is used to calculate the aggregated scorecard value. For example, if an Objective in a scorecard has two KPIs, the first KPI has a weight of 1, and the second has a weight of 3 the second KPI is essentially three times more important than the first, and this weighted relationship is part of the calculation when the KPIs values are roiled up to derive the values of their parent metric.

Other attributes may contain pointers to custom attributes that may be created for documentation purposes or used for various other aspects of the scorecard system such as creating different views in different graphical representations of the finished scorecard. Custom attributes may be created for any scorecard element and may be extended or customized by application developers or users for use in their own applications. They may be any of a number of types including text, numbers, percentages, dates, and hyperlinks.

One of the benefits of defining a scorecard is the ability to easily quantify and visualize performance in meeting organizational strategy. By providing a status as an overall scorecard level, and for each perspective, each objective or each KPI roll up, one may quickly identify where one might be off target. By utilizing the hierarchical scorecard definition along with KPI weightings, a status value is calculated at each level of the scorecard.

First column of the scorecard shows example top level metric 236 "Manufacturing" with its reporting KPIs 238 and 242 "Inventory" and "Assembly". Second column 222 in the scorecard shows results for each measure from a previous measurement period. Third column 224 shows results for the same measures for the current measurement period. In one embodiment the measurement period may include a month, a quarter, a tax year, a calendar year, and the like.

Fourth column 226 includes target values for specified KPIs on the scorecard. Target values may be retrieved from a database, entered by a user, and the like. Column 228 of the scorecard shows status indicators 230.

Status indicators 230 convey the state of the KPI. An indicator may have a predetermined number of levels. A traffic light is one of the most commonly used indicators. It represents a KPI with three-levels of results—Good, Neutral, and Bad. Traffic light indicators may be colored red, yellow, or green. In addition, each colored indicator may have its own unique shape. A KPI may have one stoplight indicator visible at any given time. Other types of indicators may also be employed to provide status feedback. For example, indicators with more than three levels may appear as a bar divided into sections, or bands. Column 232 includes trend type arrows as explained above under KPI attributes. Column 234 shows another KPI attribute, frequency.

Figure 3:
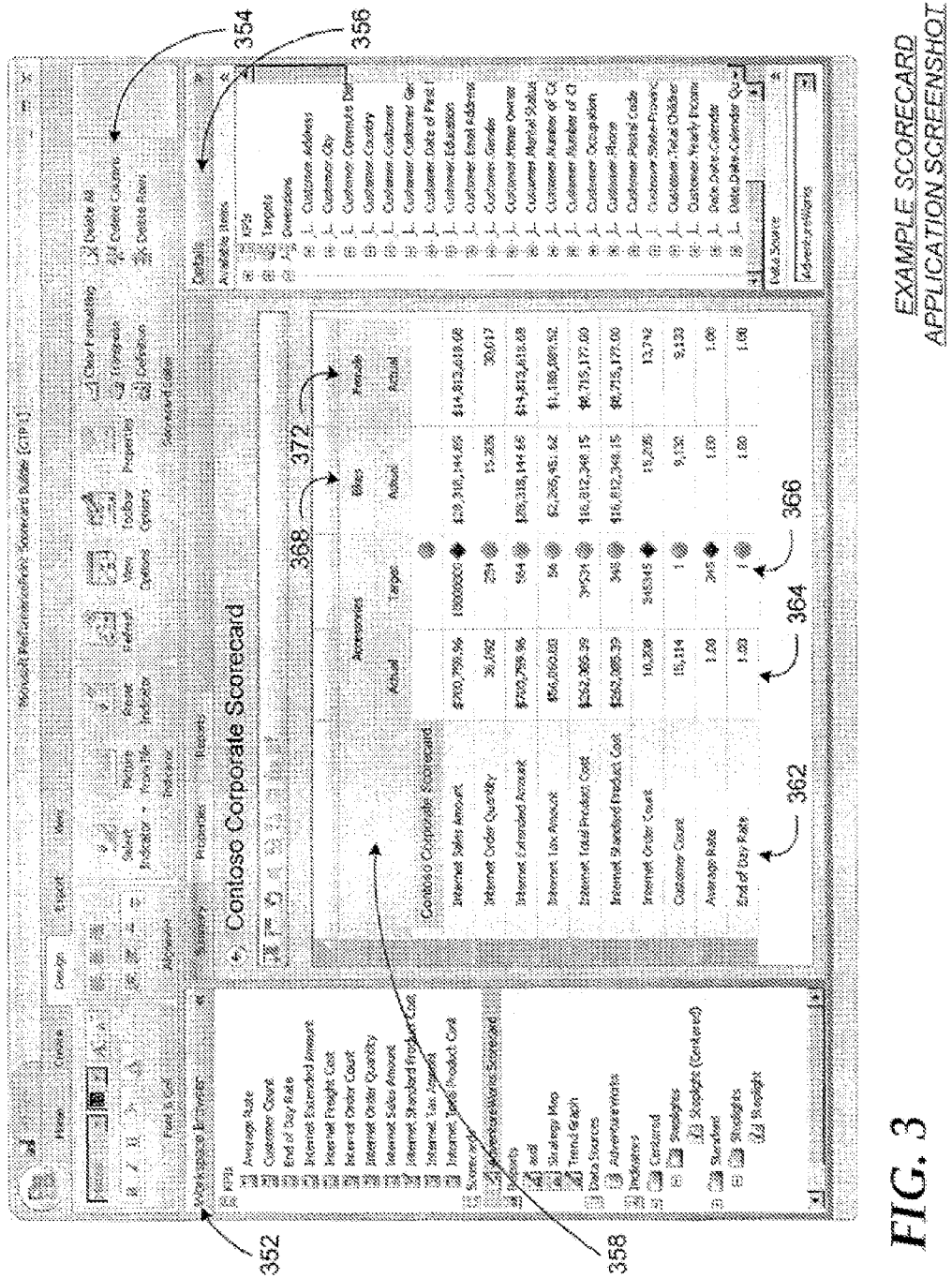
FIG. 3 illustrates a screenshot of an example scorecard application user interface.

FIG. 3 is a screenshot of an example scorecard application with an example scorecard. The example scorecard application may be part of a business logic service that collects, processes, and analyses performance data from various aspects of an organization.

The user interface of the scorecard application as shown in the screenshot include controls 354 for performing actions such as formatting of data, view options, actions on she presented information, and the like. The main portion of the user interface displays scorecard 358 "Contoso Corporate Scorecard". The scorecard includes metrics such as "Internet Sales Amount", "Internet Order Quantity", "Customer Count", and the like in column 362. Columns 364 and 366 respectively display actuals and targets for the category of "Accessories" for each of the listed metrics. Columns 368 and 372 display the actuals for the categories "Bikes" and "Female" (referring to female bikes).

Side panel 352 titled "Workspace Browser" provides a selection of available KPIs as well as elements of the scorecard such indicators and reports that are associated with the selected scorecard. Other side panel 356 provides additional details about available scorecard elements such as a collapsible list of KPIs, targets, and dimension combinations. A scorecard application, as discussed its further detail below, may include additional aspects of the scorecard such as different visualizations, linked information (geography, time and date, contact information, etc.), commentary, and so on.

According to some embodiments, data and/or views of portions of the presented scorecard may be exported to a desktop visualization application for providing personalized and scalable metric information to a user.

Figure 4:
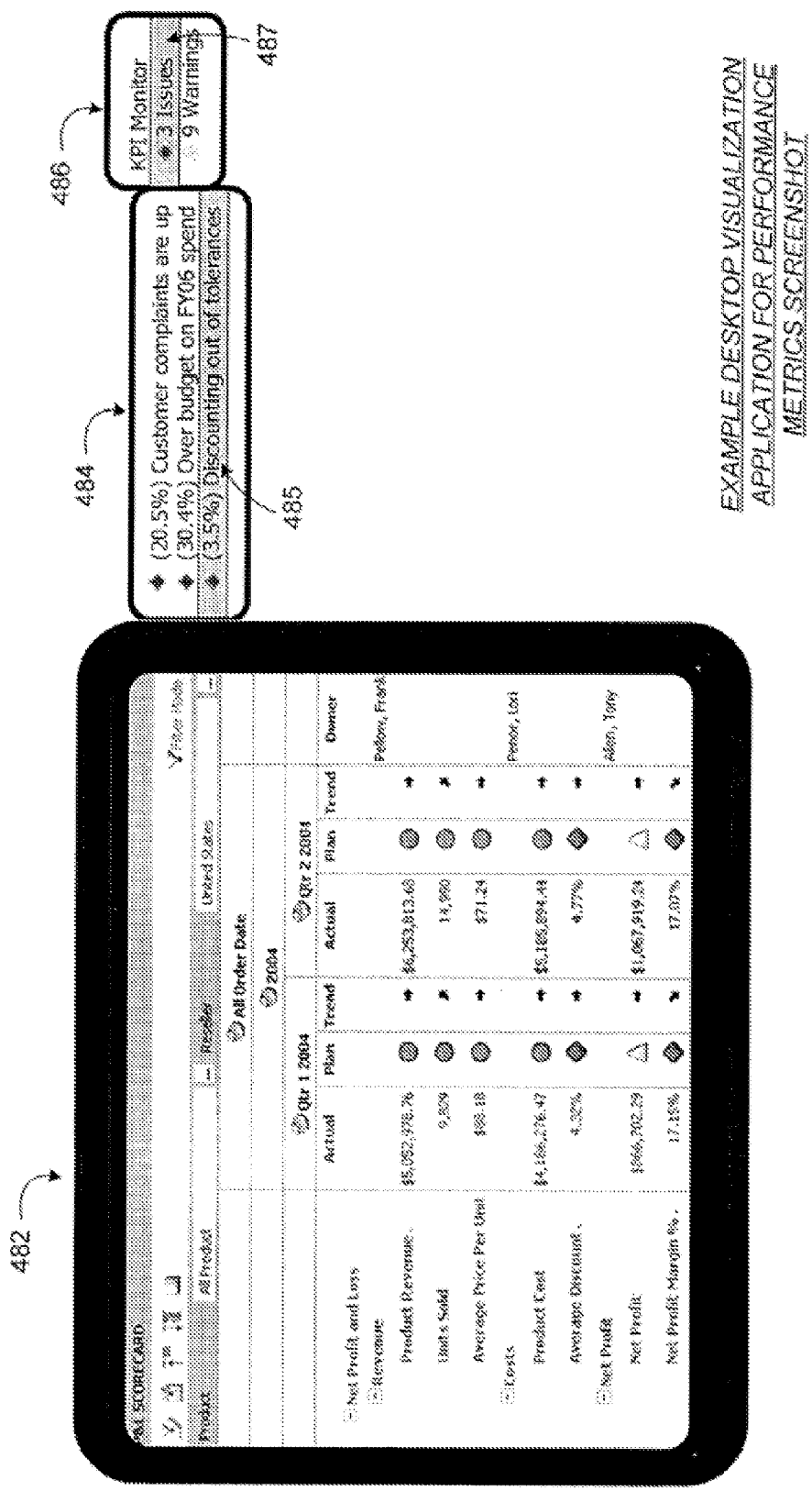
FIG. 4 illustrates a screenshot of an example desktop visualization application for performance metrics.

FIG. 4 illustrates a screenshot of an example desktop visualization application for performance metrics. As described above, a user interface of a scorecard application typically includes a number of controls and elements conveying significant amounts of information to the user and enabling the user to interact with various aspects of performance metric computation. On the other hand, desktop visualization applications may be used to convey limited information associated with selected aspects of performance metrics.

Due to their limited characters information conveyed by the desktop visualization applications is typically highly visual (e.g. a clock screen, a gauge, a number of flags, and the like). Thus, desktop visualization application for performance metrics according to embodiments may utilize elements test present a selected aspect of the information in a simplistic and visual manner. As discussed in more detail below, such elements may include gauges, traffic lights, flags, small bar graphs, and the like. Colors, shapes, video and audio may also fee used to convey information associated with a performance metric. For example, a video feed gadget may provide live or recorded view of a production line which is the subject of the performance metric. A colored pie chart shaped desktop visualization application may provide up-to-date status of a selected metric (actual vs. target(s)).

While desktop visualization applications include limited and simple user interfaces relative to full-capacity application user interlaces, they may also vary in complexity. Example desktop visualization application 482 illustrates a more complex implementation, where a portion of a scorecard is illustrated by the desktop visualization application. This enables the user to get a glimpse of some of the metrics, their actuals & targets, as well as statuses. Unlike a scorecard application user interface, desktop visualization application 482 provides limited controls for the user, however. For example, the user cannot click on individual scorecard elements and access the underlying data, make modifications, access annotations, and the like.

Some controls may be provided to the user, nevertheless. For example, a small information panel 484 may be opened up adjacent to the desktop visualization application 482 in response to the user clicking on the desktop visualization application and provide highlights of the scorecard calculations with the latest data (e.g. customer complaints are up 20.5%, over budget on FY06 spend by 30.4%, etc.).

Another example control is information panel 486, which provides a listing of issues and warnings associated with the scorecard to the user. The list of issues and warnings of information panels and the highlights of information panel 484 may include graphical symbols (e.g. icons) in addition to the textual information. Two items are highlighted in the information panels 484 and 486. The highlighted items illustrate another feature that may be provided according to some embodiments.

The desktop visualization application or its information panels may be associated with applications on the client device or remote applications provided by a hosted business service. These applications may be activated by the user selecting an item from the information panels (or the desktop visualization application itself) such as "Discounting out of tolerances" 485 on information panel 484 or "issues" 487 on information panel 486. The user can then perform more detailed operations associated with the selected items.

Figure 5:
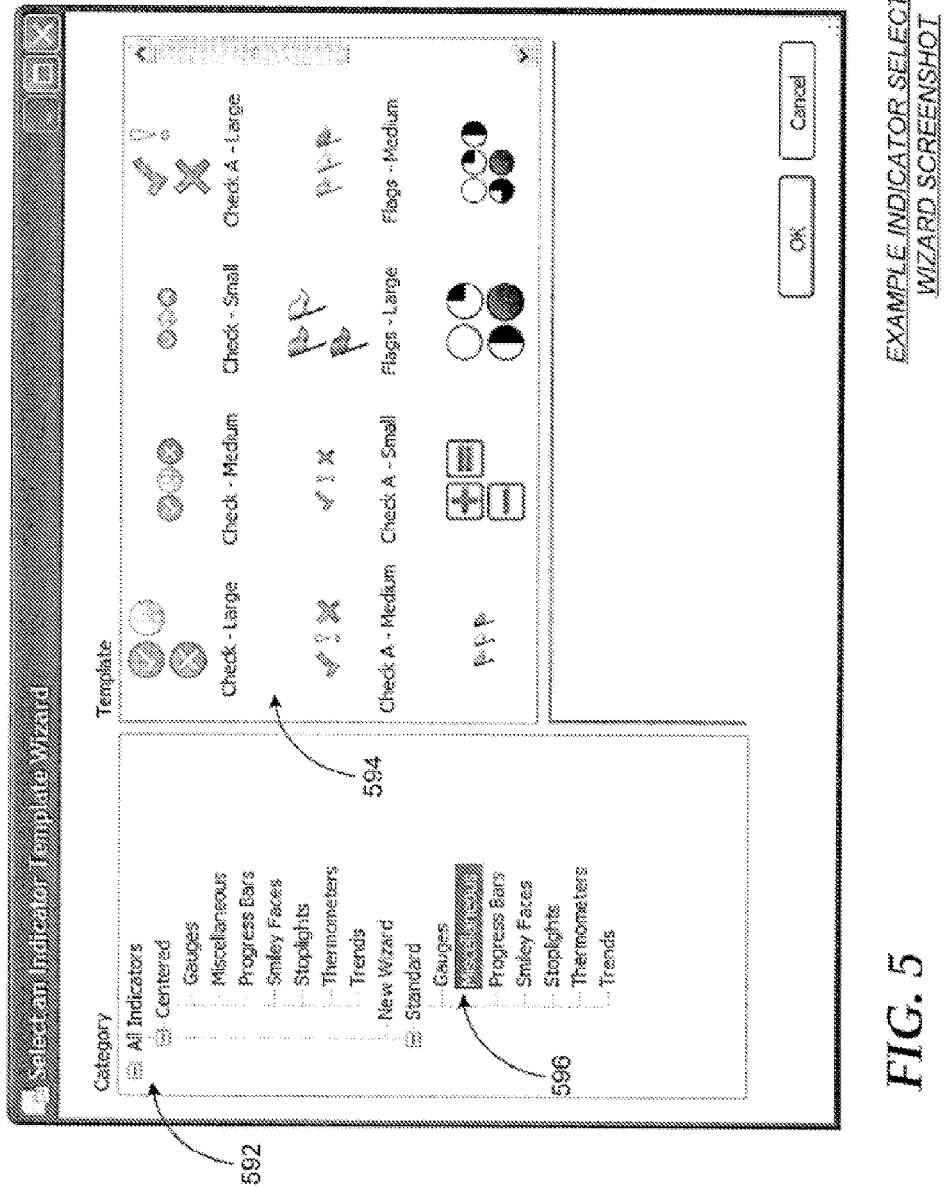
FIG. 5 illustrates a screenshot of an indicator selection wizard for a desktop visualization application for performance metrics.

FIG. 5 illustrates a screenshot of an indicator selection wizard for a desktop visualization application for performance metrics. Desktop visualization applications according to embodiments may be provided with preselected indicators coupled to predefined metrics or analysis results. According to other embodiments, the user may be enabled to select one or more indicators to be used by a desktop visualization application and define scorecard elements (and/or analysis results) to be reflected by the selected indicators. The indicator selection wizard is one method of implementing such a selection.

Category panel 592 lists available indicators by category in a collapsible list format. The list of available indicators may also be provide using other formats. In the example screenshot, "Miscellaneous" category 596 is selected under the main group of Standard Indicates.

Template panel 594 includes visual representations of available indicators in this category. The indicators include circled check marks, check marks, flags, pie chart icons, and the like. As mentioned previously, desktop visualization applications may include single or multiple indicators. The indicators employ geometric units to visualize business performance and show magnitude, patterns of structured and unstructured data, interrelationships, causalities, and dependencies. Through vitalizing outputs of quantitative models business users may be enabled to make faster, more relevant decisions based on date that is readily interpreted.

The example indicator selection wizard may be part of an embeddable authoring user interface for generating performance metric based visualizations. For example, the wizard may provide a selection of objects from a graphics application such as VISIO® by MICROSOFT CORP. of Redmond, Wash.

Figure 6:
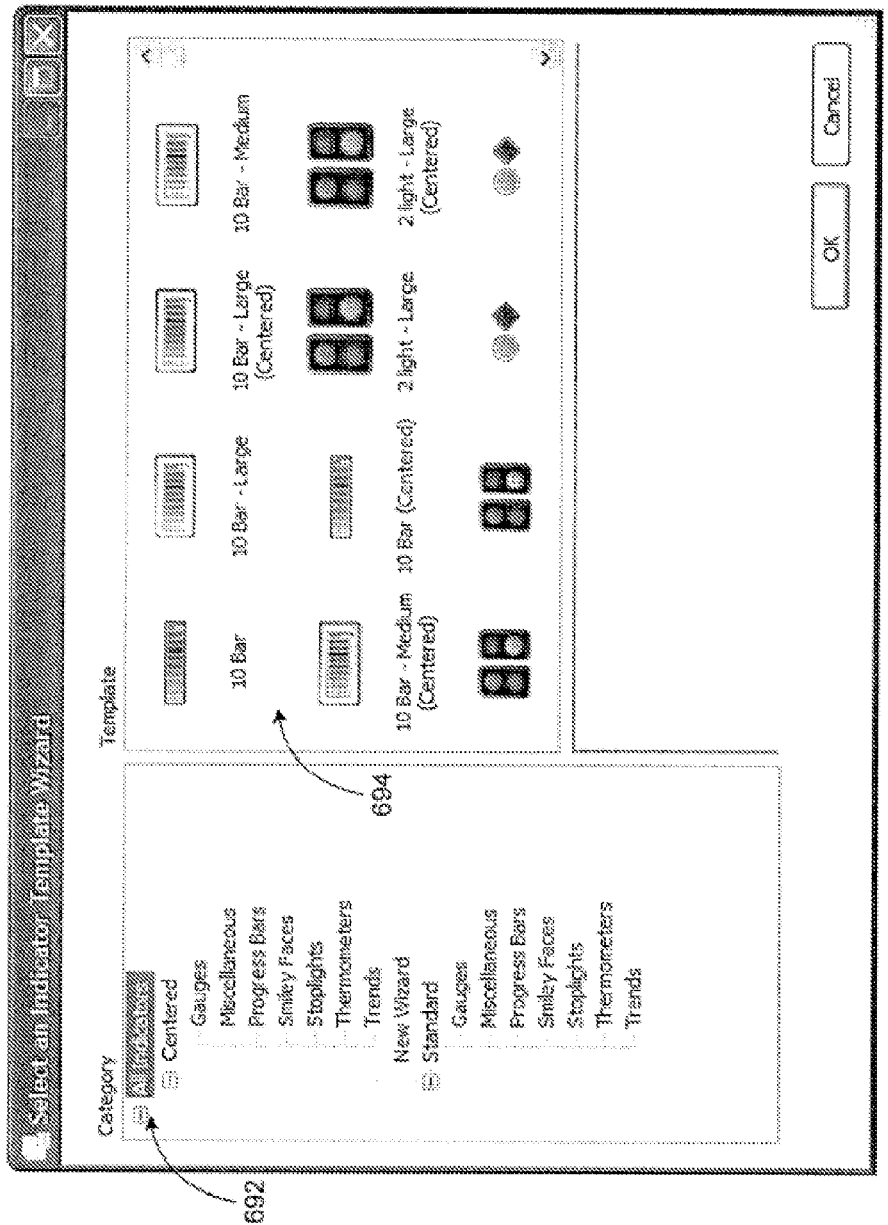
FIG. 6 illustrate another screenshot of an indicator selection wizard for a desktop visualization application for performance metrics.

FIG. 6 illustrates another screenshot of an indicator selection wizard for a desktop visualization application for performance metrics. In the example screenshot of FIG. 6, All Indicators category is selected by the user causing all available indicators to be listed in Template panel 694.

The example indicators in Template panel 694 include bar indicators, traffic light indicators, traffic sign indicators, which utilize shape and color to convey performance metric information to the user.

Figure 7:
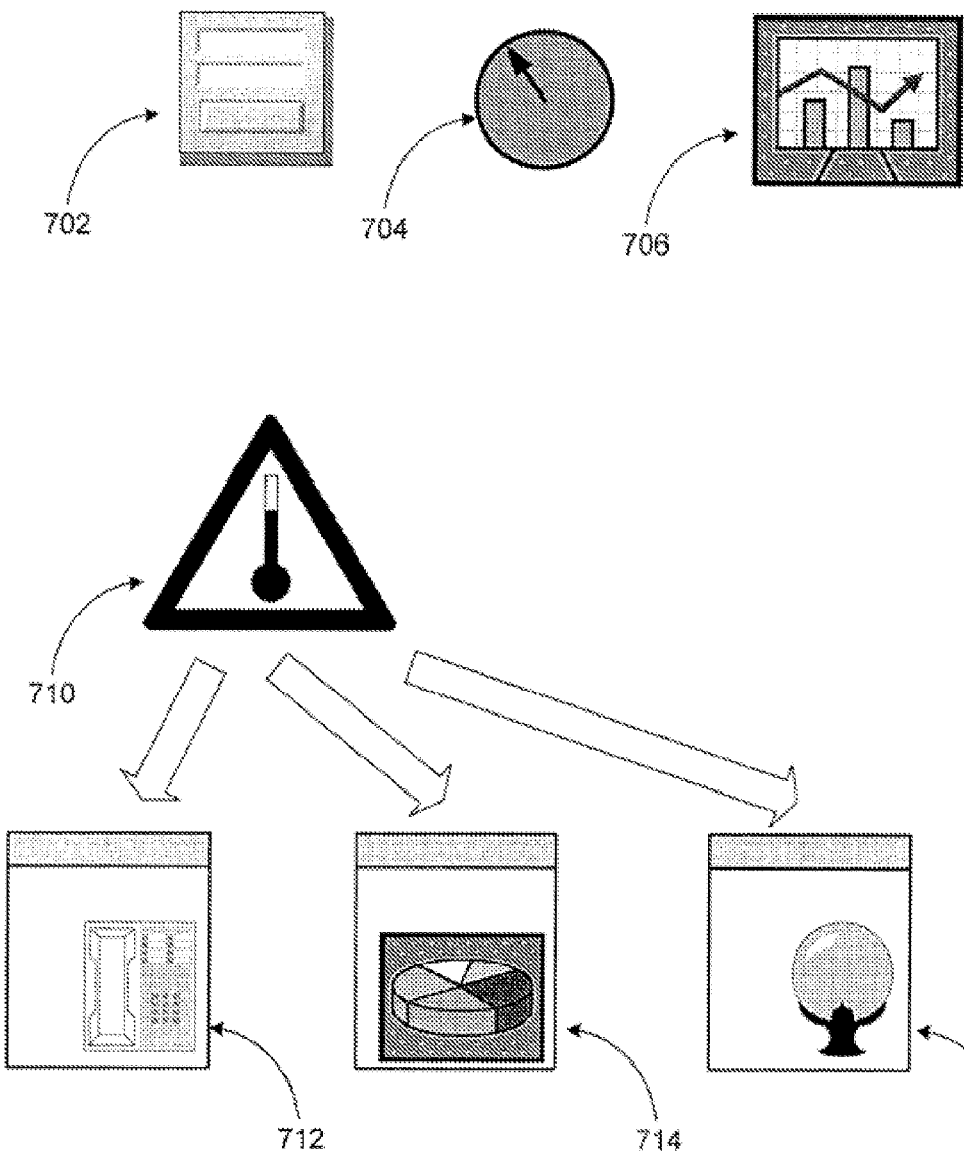
FIG. 7 illustrates example desktop visualization applications and expansion to various applications from a selected desktop visualization application.

FIG. 7 illustrates example desktop visualization applications and expansion to various applications from a selected desktop visualization application. Desktop visualization application 702 is an example of a single indicator desktop visualization application that shows the status of a metric with a bar indicator. The bar indicator may fill up based on a comparison of a actual and a target associated with the metric.

Desktop visualization application 704 is another single indicator desktop visualization application. A circular meter style indicator provides visual representation of a metric's status to the user. Desktop visualization application 706 is an example of a miniature chart type desktop visualization application. A simplified bar chart may display the status of multiple metrics or multiple targets of a single metrics, or even temporal change of a metric over a defined data range. An indicator arrow may further provide trend information.

Desktop visualization application 706 is an example of a composite desktop visualization application. The desktop visualization application includes a thermometer indicator showing the status of a metric, A background color of the desktop visualization application and/or a fill-color of the thermometer indicator may former reflect the status according to a color code (e.g. green for on target, yellow for slightly off target, and red for off target). The desktop visualization application may further be configured to adjust its shape according to a status of the metric. For example, the outline of the desktop visualization application may take traffic sign style shapes based on the status (e.g. round for on target, triangular for slightly off target, hexagonal for off target).

FIG. 7 further illustrates another feature of performance metric based desktop visualization applications according to embodiments. For example, the user may be provided an option to activate a communication application 712, a presentation application 714, or trend analysis application 716. The applications may include a number of local applications on the client device or remote application hosted by a business service. According to further embodiments, hypertext links may also be provided in response to a user selection associated with the desktop visualization application (through a drop down menu, selection of a portion of the desktop visualization application, and so on).

Figure 8:
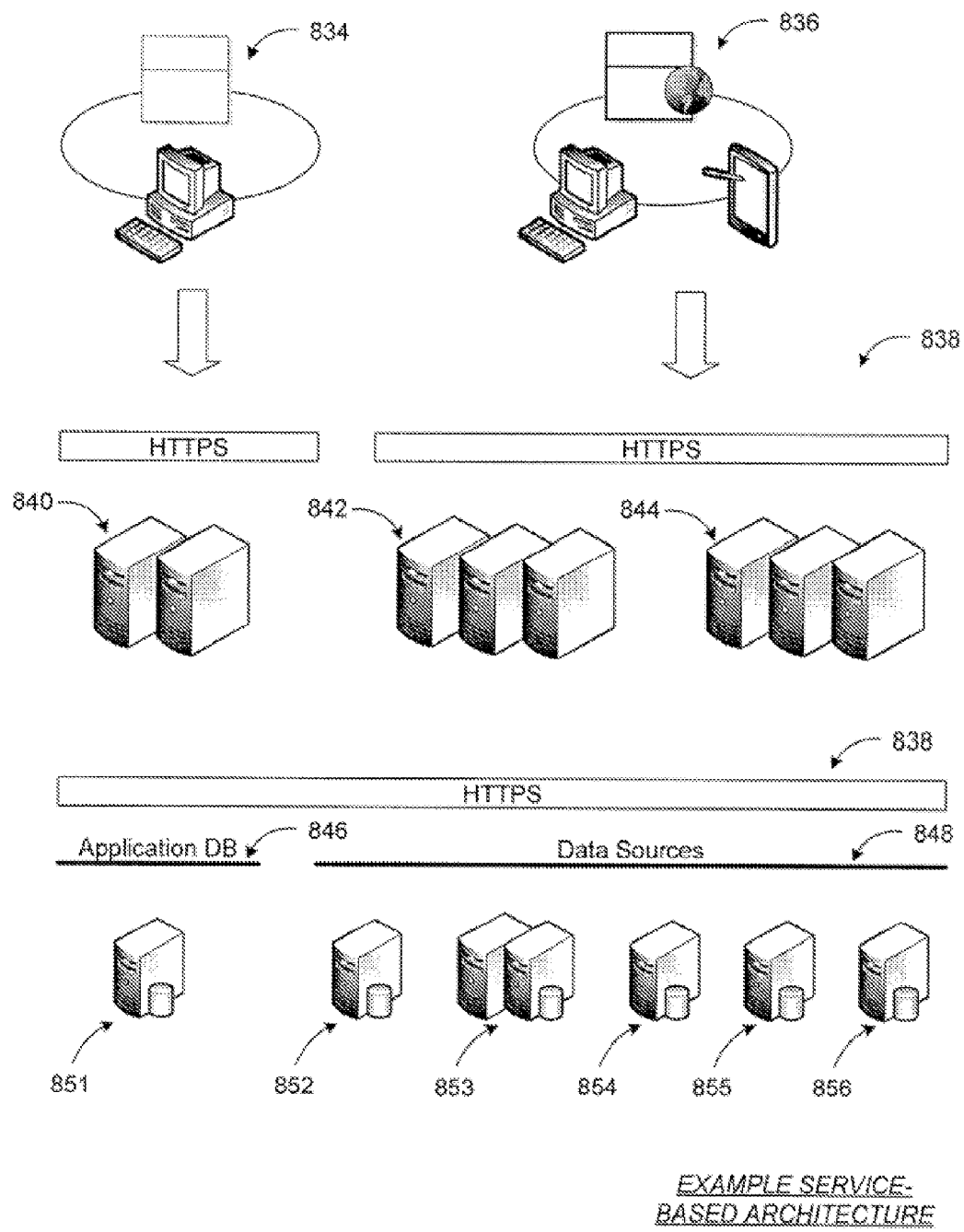
FIG. 8 illustrates an example service-based architecture in which the desktop visualization application for performance metrics may be deployed.

FIG. 8 illustrates an example service-based architecture in which the desktop visualization application for performance metrics may be deployed. Service based architectures are an increasingly popular style for building software applications that use services available in a network such as the web. They promote loose coupling between software components so that they can be reused. Applications in a service based architecture are built based on services. A service is an implementation of a well-defined business functionality, and such services can then be consumed by clients in different applications or business processes.

A service based architecture allows for the reuse of existing assets where new services can be created from an existing infrastructure of systems. In other words, it enables businesses to leverage existing investments by allowing them to reuse existing applications, and promises interoperability between heterogeneous applications and technologies. Service based architectures provide a level of flexibility in the sense that services are software components with well-defined interfaces that are implementation-independent. An important aspect of service based architecture is the separation of the service interface from its implementation. Such services are consumed by clients that are not concerned with how these services will execute their requests. Services are commonly self-contained (perform predetermined tasks) and loosely coupled. Furthermore, services can be dynamically discovered, and composite services can be built from aggregates of other services.

A service based architecture uses a find-bind-execute paradigm. In this paradigm, service providers register their service in a public registry. This registry is used by consumers to find, services that match certain criteria. If the registry has such a service, it provides the consumer with a contract and an endpoint address for that service. Service based applications are typically distributed multi-tier applications that have presentation, business logic, and persistence layers. Services are the building blocks of service based applications.

In FIG. 8, date associated with performance metric calculations may be stored and provided by scorecard database(s) 846 managed by scorecard database server 851. Scorecard database server 851 may manage, exchange of scorecard data based granular, role based permissions. Source data for metric calculations and statistical analyses may be provided by data sources 848.

Data sources 848 may include business models database server 852, analysis services database server(s) 853, tables server 854, lists server files server 856 (e.g. text files, spreadsheet files, and the like), and so on. The data sources may be managed by one or more servers of any type discussed herein. The scorecard database server and data source servers may communicate with servers managing performance metric services through a secure network communication protocol such as HTTPS 838.

Performance metric services may include scorecard service managed by scorecard server(s) 840. Scorecard server(s) 840 may also provide web services. Reporting services may be provided by one or more reporting servers 842. Reporting services may include providing results of statistical analyses, performance metric computations, presentations, and the like in various formats based on subscriber permissions, profiles, client devices, and client applications. According to an example embodiment, data may be provided to one or more desktop visualization applications installed on a user's desktop such that a limited presentation is portrayed on the user's desktop.

Moreover, shared services servers 844 may manage shared services that enable individual users to access the scorecard services, presentations, and data through client devices 836. Client devices 836 may include specialized applications or web applications to facilitate the communication through a secure protocol such as HTTPS 838.

Scorecard computations may also be performed in coordination with scorecard server(s) 840 by a client application on client device 834 communicating with the scorecard servers through HTTPS 838. As illustrated by reporting servers 842 and shared services servers 844, some or all of the servers at different levels of the architecture may support web farming.

Figure 9:
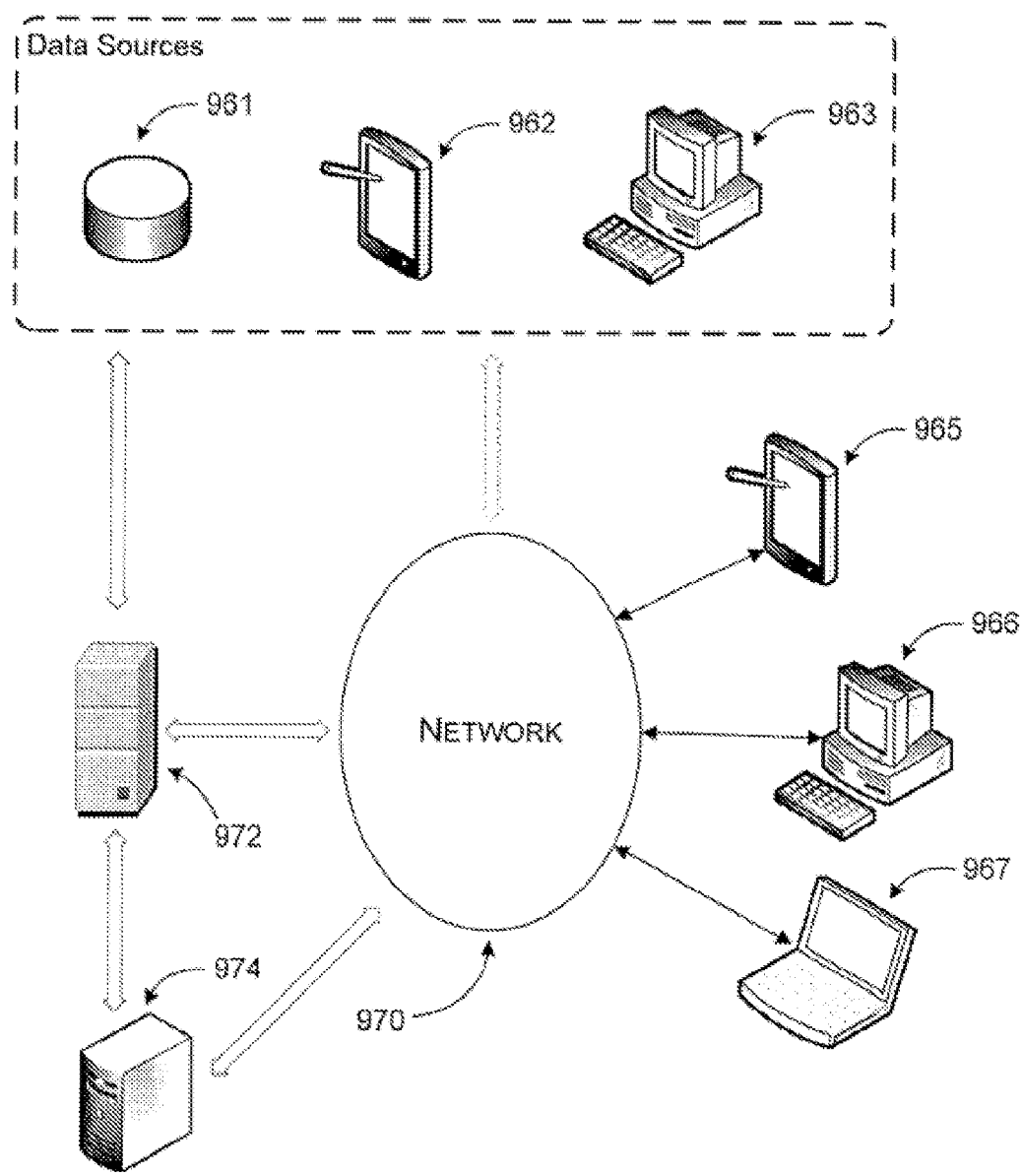
FIG. 9 is a diagram of a networked environment where embodiments may be implemented.
Figure 10:
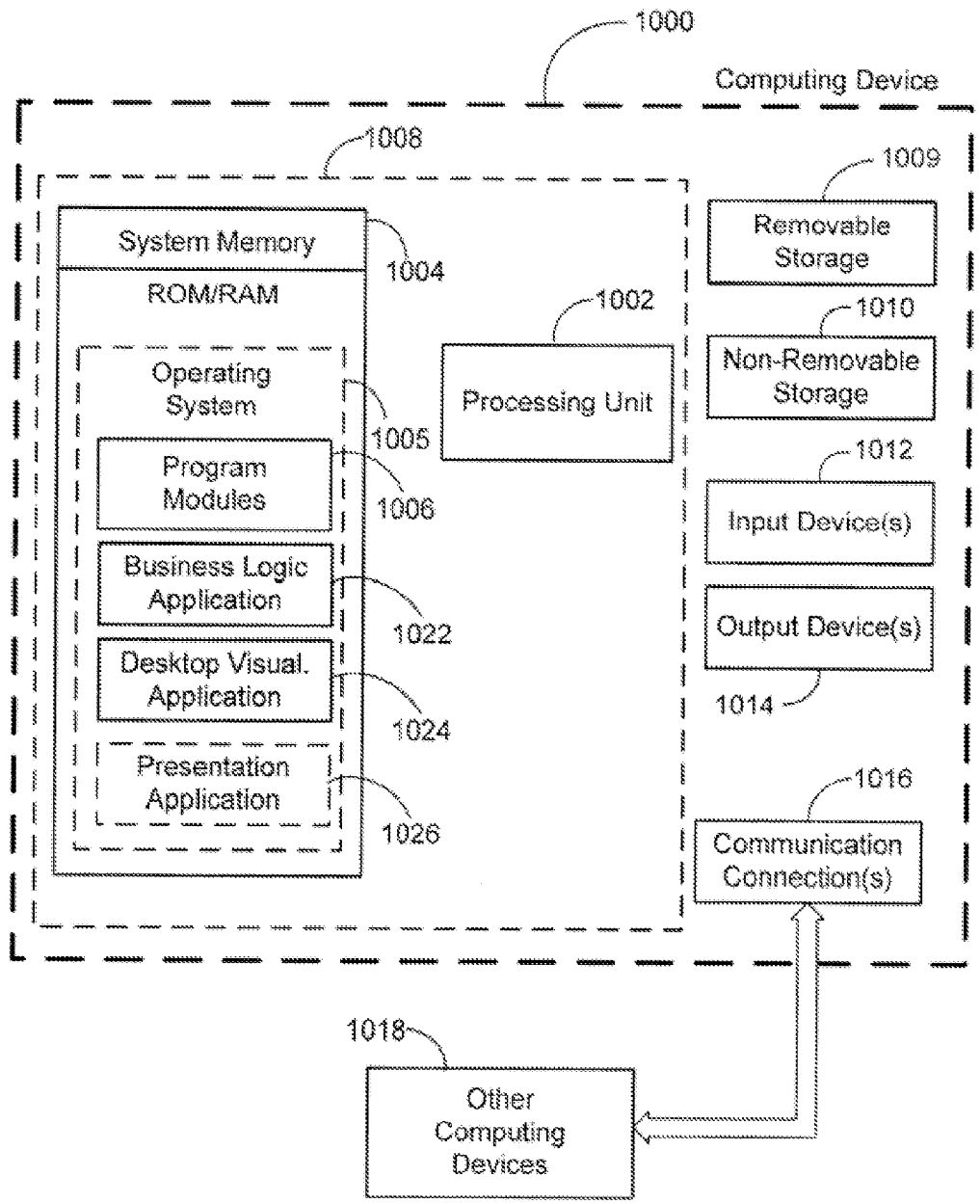
FIG. 10 is a block diagram of an example computing operating environment, where embodiments may be implemented.

Referring now to the following figures, aspects and exemplary operating environments will be described. FIG. 9, FIG. 10, and the associated discussion are intended to provide a brief, general description of a suitable computing environment in which embodiments may be implemented.

FIG. 9 is a diagram of a networked environment where embodiments may be implemented. The system may comprise any topology of servers, clients, Internet service providers, and communication media. Also, the system may have a static or dynamic topology. The term "client" may refer to a client application or a client device employed by a user to perform operations associated with rendering performance metric data using geometric objects. While a networked business logic system may involve many more components, relevant ones are discussed in conjunction with this figure.

In a typical operation according to embodiments, business logic service may be provided centrally from server 972 or in a distributed manner over several servers (e.g. servers 972 and 974) and/or client devices. Server 972 may include implementation of a number of information systems such as performance measures, business scorecards, and exception repotting. A number of organization-specific applications including, but not limited to, financial reporting/analysis, booking, marketing analysis, customer service, and manufacturing planning applications may also be configured, deployed, and shared in the networked system.

Data sources 961-963 are examples of a number of data sources that may provide input to server 972. Additional data sources may include SQL servers, databases, non multi-dimensional data sources such as test files or EXCEL® sheets, multi-dimensional data source such as data cubes, and the like.

Users may interact with the server running the business logic service from client devices 965-967 over network 970. Users may also directly access the data from server 972 and perform analysis on their own machines. In some embodiments, users may set up personalized desktop visualization applications displayed on the client devices 965-967 that receive data (and/or views) from the business logic service and provide scalable views of metrics.

Client devices 965-967 or servers 972 and 974 may be in communications with additional client devices or additional servers over network 970. Network 970 may include a secure network such as an enterprise network, an unsecure network such as a wireless open network, or the Internet. Network 970 provides communication between the nodes described herein. By way of example, and not limitation, network 970 may include wired media such as a wired network or direct-wired connection, and wireless media such as acoustic, RF, infrared and other wireless media.

Many other configurations of computing devices, applications, data sources, data distribution and analysis systems may be employed to implement providing personalized and scalable performance metric information using desktop visualization applications in a service based architecture. Furthermore, the networked environments discussed in FIG. 9 are for illustration purposes only. Embodiments are not limited to the example applications, modules, or processes. A networked environment for may be provided in many other ways using the principles described herein.

With reference to FIG. 10, a block diagram of an example computing operating environment is illustrated, such as computing device 1000. In a basic configuration, the computing device 1000 typically includes at least one processing unit 1002 and system memory 1004. Computing device 1000 may include a plurality of processing units that cooperate in executing programs. Depending on the exact configuration and type of computing device, the system memory 1004 may be volatile (such as RAM), non-volatile (such as ROM, flash memory, etc.) or some combination of the two. System memory 1004 typically includes an operating system 1005 suitable for controlling the operation of a networked personal computer, such as the WINDOWS® operating systems from MICROSOFT CORPORATION of Redmond, Wash. The system memory 1004 may also include one or more software applications such as program modules 1006, business logic application 1022, desktop visualization application 1024, and optional presentation application 1026.

Business logic application 1022 may fee any application that processes and generates scorecards and associated data. Desktop visualization application 1024 may be a limited user interface associated with a module within business logic application 1022, and independent module, or the operating system. Desktop visualization application 1024 may provide personalized and scalable performance metric information based on data received from business logic application 1022 or another source. Presentation application 1026 or business logic application 1022 may be associated with desktop visualization application 1024 such that user interfaces or either application may be activated upon user selection of an aspect of desktop visualization application 1024. Presentation application 1026 or business logic application 1022 may be executed in an operating system other than operating system 1005. This basic configuration is illustrated in FIG. 10 by those components within dashed line 1008.

The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by removable storage 1009 and non-removable storage 1010. Computer storage media may include volatile and nonvolatile, removable and non-removable media implemented in any method or technology for storage of information, such as computer readable instructions, data structures, program modules, or other data. System memory 1004, removable storage 1009 and non-removable storage 1010 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media may be part of device 1000. Compiling device 1000 may also have input device(s) 1012 such as keyboard, mouse, pen, voice input device, touch input device, etc. Output device(s) 1014 such as a display, speakers, printer, etc. may also be included. These devices are well known in the art and need not be discussed at length here.

The computing device 1000 may also contain communication connections 1016 that allow the device to communicate with other computing devices 1018, such as over a network in a distributed computing environment, for example, an intranet or the Internet. Communication connection 1016 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 11:
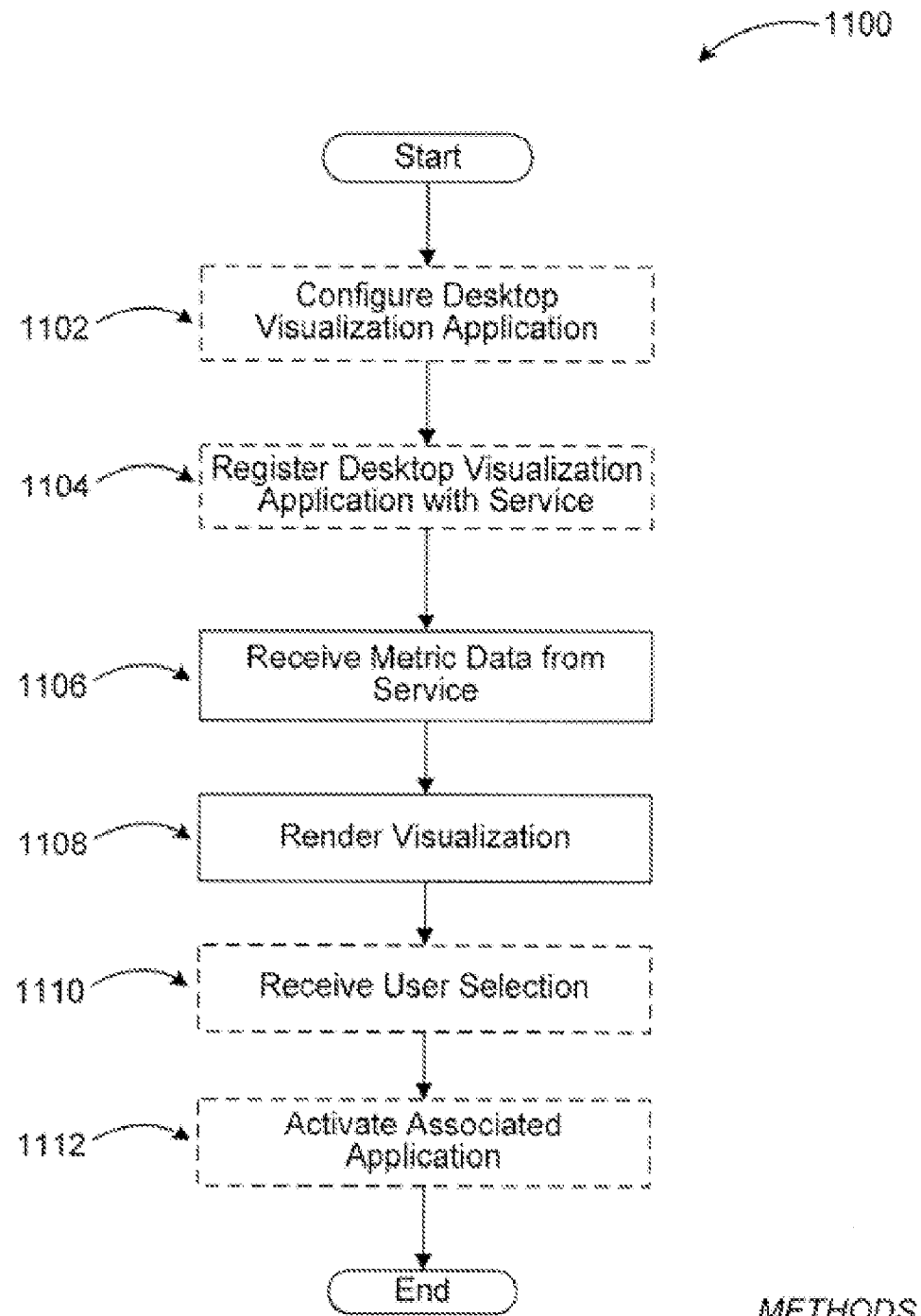
FIG. 11 illustrates a logic flow diagram for a process of employing desktop visualization applications for performance metrics in a service-based architecture.

FIG. 11 illustrates a logic flow diagram for a process of employing desktop visualization application for performance metrics in a service-based architecture. Process 1100 may be implemented in a service architecture based business logic service.

Process 1100 begins with optional operation 1102, where a desktop visualization application is configured. The application may be configured by a user or by a hosted business service automatically based on a user profile. Processing advances from optional operation 1102 to optional operation 1104.

At optional operation 1104, the desktop visualization application is registered with the hosted business service. Registration may include authorization based on a user permission, user profile, or a network communication status. Processing proceeds from optional operation 1104 to operation 1106.

At operation 1106, performance metric data is received from the hosted business service. A portion of the data may also be received fern a local data store. Processing moves from operation 1106 to operation 1108.

At operation 1108, a visualization based on the received performance metric data is rendered. As described previously, one or more indicators, icons, miniature charts, audio, and video may fee used to render the visualization. Processing advances to optional operation 1110 from operation 1108.

At optional operation 1110, a user selection is received by the desktop visualization application. The user selection may be the user clicking on a portion of the visualization, selecting a checkbox, a radio button, or any other icon. The selection may also include the user clicking on a portion of a rendered view (e.g. a partial scorecard view). Processing advances to optional operation 1112 from optional operation 1110.

At optional operation 1112, an application associated with the rendered visualization is activated in response to the user selection. The application may be a local application or a remote application managed by the hosted business service. After operation 1112, processing moves to a calling process for further actions.

The operations included in process 1100 are for illustration purposes. Rendering visualizations by a desktop visualization application based on performance metric data from a hosted business service may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for rendering a performance metric based visualization, the method comprising:
   receiving performance metric data at a desktop visualization application from a hosted business service, wherein the desktop visualization application is registered with the hosted business service;
   providing a list of user-selectable indicators associated with visualizing the performance metric data;
   receiving a selection of at least one user-selectable indicator;
   receiving a definition of at least one performance metric data element to be reflected by the at least one user-selectable indicator;
   rendering a visualization based on the received performance metric data by the desktop visualization application;
   receiving a first user selection of the at least one performance indicator;
   providing, in response to receiving the first user selection, an information panel providing additional information associated with the at least one performance indicator;
   receiving a second user selection of the additional information; and
   activating at least one application associated with the additional information.

2. The method of claim 1, further comprising:
   enabling, a user to configure at least one of a layout and a data delivery attribute of the desktop visualization application; and
   registering the desktop visualization application with the hosted business service.

3. The method of claim 1, further comprising:
   authorizing data delivery to the desktop visualization application based on at least one from a set of: a user permission, a user profile, and a network connection status.

4. The method of claim 1, further comprising:
   receiving a user selection by the desktop visualization application; and
   activating an application associated with the received user selection.

5. The method of claim 4, wherein activating the application associated with the received user selection comprises activating one of a local application and a remote application managed by the hosted business service.

6. The method of claim 5, wherein activating the local application and the remote application comprises activating one from a set of: a presentation application, an analysis application, a communication application, a spreadsheet application, and a graphics application.

7. The method of claim 1, further comprising employing, by the desktop visualization application, at least one from a set of: an indicator set, a color scheme, a shape scheme, a video stream, and audio to render the visualization.

8. The method of claim 7, wherein employing the indicator set comprises employing one of: a gauge, a flag, a meter, a progress bar, a pie chart, a traffic sign, a thermometer, and a smiley face.

9. The method of claim 1, further comprising:
caching the received data at a client device executing the desktop visualization application.

10. The method of claim 1, further comprising:
partitioning service providers for performance metric services using virtualized instances.

11. The method of claim 1, wherein the desktop visualization application is provided as a plug-in module.

12. The method of claim 1, wherein the desktop visualization application is configured, to receive one of a live data feed and an aggregation of dependent data feeds.

13. The method of claim 1, wherein the desktop visualization application is configured to be launched from a thin client using user defined parameters.

14. The method of claim 1, further comprising:
tracking desktop visualization application activities for billing a user by at least one of the hosted business service and a third service provider.

15. A system for rendering a performance metric based visualization, the system comprising:
a memory;
a processor coupled to the memory, wherein the processor is configured to:
provide, to a desktop visualization application, a list of user-selectable indicators associated with the visualizing performance metric data;
receive a selection of at least one user-selectable indicator;
configure at least one parameter to be reflected by the at least one user-selectable indicator of the desktop visualization application based on one of a user input and a preset profile;
authorize data delivery to the desktop visualization application based on a user permission;
provide performance metric data to the desktop visualization application;
enable caching of the performance metric data;
enable rendering of a visualization based on the provided performance metric data;
receive a first user selection of the at least one performance indicator;
provide, in response to receiving the first user selection, an information panel providing additional information associated with the at least one performance indicator;
receive a second user selection of the additional information;
activate at least one application associated with the additional information.

16. The system of claim 15, wherein the client device includes one of: a mobile computing device, an ultra-mobile computing device, a personal digital assistant, an in-car computing system, and a tablet computing device.

17. The system of claim 15, wherein the processor is further configured to automatically provide at least one of a service update and a security update to the desktop visualization application.

18. A computer-readable storage medium with instructions stored thereon which when executed perform a method for rendering a performance metric based visualization, the method executed by the instructions comprising:
provide at least one user-selectable indicator associated with the performance metric data to a desktop visualization application;
configuring a desktop visualization application including the at least one user-selectable indicator at least in part based on a user input;
registering the desktop visualization application with a hosted business service;
providing performance metric data to the desktop visualization application from the hosted business service;
enabling caching of the performance data at a client device executing the desktop visualization application;
enabling rendering of a visualization by the desktop visualization application based on the provided performance metric data; wherein a rendered visualization conveys a trend of the performance metric data and a comparison of actual data values associated with the performance metric data with target data values associated with the performance metric data;
providing to the desktop visualization one of a live media and recorded media of a subject of the performance metric;
activating an information panel adjacent to the desktop visualization application in response to receiving a first user selection through the desktop visualization, the information panel conveying additional information associated with the performance metric data, wherein the additional information comprises at least one of: issues, warnings, and highlights associated with the performance metric data;
receiving a user selection of the additional information;
activating at least one application associated with the additional information; and
tracking activities associated with the visualization for billing the user by the hosted business service.

19. The computer-readable storage medium of claim 18, wherein the desktop visualization application includes an embeddable user interface embedded into an application on the client device executing the desktop visualization application.

20. The computer-readable storage medium of claim 18, wherein the hosted business service further provides an online collaboration service associated with the visualization.

* * * * *